United States Patent
Polese et al.

(10) Patent No.: US 12,218,734 B2
(45) Date of Patent: *Feb. 4, 2025

(54) COORDINATION-FREE MMWAVE BEAM MANAGEMENT WITH DEEP WAVEFORM LEARNING

(71) Applicant: Northeastern University, Boston, MA (US)

(72) Inventors: Michele Polese, Boston, MA (US); Francesco Restuccia, Boston, MA (US); Tommaso Melodia, Newton, MA (US)

(73) Assignee: Northeastern University, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/093,602

(22) Filed: Jan. 5, 2023

(65) Prior Publication Data
US 2023/0163830 A1 May 25, 2023

Related U.S. Application Data

(63) Continuation of application No. 17/481,378, filed on Sep. 22, 2021, now Pat. No. 11,588,539.

(60) Provisional application No. 63/081,938, filed on Sep. 23, 2020.

(51) Int. Cl.
*H04B 7/08* (2006.01)
*H04B 7/06* (2006.01)

(52) U.S. Cl.
CPC ........... *H04B 7/086* (2013.01); *H04B 7/0695* (2013.01); *H04B 7/088* (2013.01)

(58) Field of Classification Search
CPC ....... H04B 7/086; H04B 7/0695; H04B 7/088
See application file for complete search history.

(56) References Cited

U.S. PATENT DOCUMENTS

| | | | |
|---|---|---|---|
| 10,432,290 B2 | 10/2019 | Luo et al. | |
| 11,588,539 B2* | 2/2023 | Polese | H04B 7/086 |
| 2020/0120458 A1 | 4/2020 | Aldana et al. | |
| 2020/0358514 A1 | 11/2020 | Landis et al. | |
| 2021/0092703 A1* | 3/2021 | Min | G01S 5/0218 |
| 2021/0135723 A1 | 5/2021 | Chiu et al. | |
| 2021/0184744 A1* | 6/2021 | Pezeshki | H04L 5/0023 |

(Continued)

OTHER PUBLICATIONS

Giordani et al., "Toward 6G Networks: Use Cases and Technologies," IEEE Commun. Mag., vol. 58, pp. 55-61, Mar. 2020.

(Continued)

*Primary Examiner* — Kenneth T Lam
(74) *Attorney, Agent, or Firm* — Verrill Dana, LLP

(57) ABSTRACT

A system and method for beam management in a wireless network are provided. A learning module having a trained classification module processes received I/Q input samples to determine transmitted beam information of incoming RF transmissions. The learning module includes a beam inference engine to determine waveforms waveform characteristics of incoming RF transmissions beams, and an angle of arrival engine operative to determine an angle of arrival of the incoming RF transmissions beams on an antenna array. An incoming RF transmission beam and angle of arrival are selected based on the determined waveforms for beam management operations.

18 Claims, 14 Drawing Sheets

(56) References Cited

U.S. PATENT DOCUMENTS

| | | | |
|---|---|---|---|
| 2021/0385040 A1* | 12/2021 | Pezeshki | H04L 25/0228 |
| 2021/0399775 A1* | 12/2021 | Lehtimaki | G01S 3/10 |
| 2021/0409089 A1 | 12/2021 | Haider et al. | |
| 2022/0038163 A1 | 2/2022 | Va et al. | |
| 2022/0046385 A1 | 2/2022 | Sundararajan et al. | |
| 2022/0141684 A1* | 5/2022 | Li | H04B 17/15 |
| | | | 370/337 |
| 2022/0158702 A1 | 5/2022 | Nallampatti Ekambaram et al. | |

OTHER PUBLICATIONS

Giordani et al., "A Tutorial on Beam Management for 3GPP NR at mmWave Frequencies," IEEE Commun. Surveys Tuts., vol. 21, pp. 173-196, First Quarter 2019.

Asadi et al., "FML: Fast Machine Learning for 5G mmWave Vehicular Communications," in Proc. of IEEE Conf. on Computer Communications (INFOCOM), pp. 1961-1969; 2018.

Haider et al., "LiSteer: mmWave Beam Acquisition and Steering by Tracking Indicator LEDs on Wireless APs," in Proc. of the 24th Annual Intl. Conf. on Mobile Computing and Networking, pp. 273-288, 2018.

O'Shea et al., "An Introduction to Deep Learning for the Physical Layer," IEEE Trans. Cogn. Commun. Netw., vol. 3, No. 4, pp. 563-575, 2017.

O'Shea et al., "Over-the-Air Deep Learning Based Radio Signal Classification," IEEE J. Sel. Topics Signal Process., vol. 12, pp. 168-179, Feb. 2018.

Jian et al., "Deep Learning for RF Fingerprinting: A Massive Experimental Study," IEEE Internet Things Mag., vol. 3, No. 1, pp. 50-57, 2020.

Zhou et al., "Deep Learning-based Beam Management and Interference Coordination in dense mmWave networks," IEEE Trans. Veh. Technol., vol. 68, No. 1, pp. 592-603, 2018.

Alkhateeb et al., "Deep Learning Coordinated Beamforming for Highly-mobile Millimeter Wave Systems," IEEE Access, vol. 6, pp. 37328-37348, 2018.

Alkhateeb, A., "DeepMIMO: A Generic Deep Learning Dataset for Millimeter Wave and Massive MIMO Applications," in Proc. of Information Theory and Applications Workshop (ITA), pp. 1-8; Feb. 2019.

Wang et al., "MmWave Beam Prediction with Situational Awareness: A Machine Learning Approach," in IEEE 19th Intl. Workshop on Signal Processing Advances in Wireless Communications (SPAWC), 5 pages; IEEE, 2018.

Mao et al., "Deep Learning for Intelligent Wireless Networks: A Comprehensive Survey," IEEE Commun. Surveys Tuts., pp. 2595-2621; Fourth quarter 2018.

Sim et al., "An Online Context-Aware Machine Learning Algorithm for 5G mmWave Vehicular Communications," IEEE/ACM Trans. Netw., vol. 26, No. 6, pp. 2487-2500, 2018.

Polese et al., "DeepBeam: Deep Waveform Learning for Coordination-Free Beam Management in mmWave Networks," arXiv:2012.14350v2 [cs.NI], 10 pages, Jun. 7, 2021.

Restuccia et al., "PolymoRF: Polymorphic Wireless Receivers Through Physical-Layer Deep Learning," Proc. of ACM Mobi-Hoc, pp. 271-280, 2020.

Restuccia et al., "Big Data Goes Small: Real-Time Spectrum-Driven Embedded Wireless Networking Through Deep Learning in the RF Loop," Proc. of IEEE Conf. on Computer Communications (INFOCOM), pp. 2152-2160, 2019.

Restuccia et al., "DeepWiERL: Bringing Deep Reinforcement Learning to the Internet of Self-Adaptive Things," Proc. of IEEE Conf. on Computer Communications (INFOCOM), pp. 844-853, 2020.

Riyaz et al., "Deep Learning Convolutional Neural Networks for Radio Identification," IEEE Commun. Mag., vol. 56, No. 9, pp. 146-152, 2018.

Jagannath et al., "Machine Learning for Wireless Communications in the Internet of Things: A Comprehensive Survey," Ad Hoc Networks (Elsevier), vol. 93, p. 101913, 2019.

\* cited by examiner

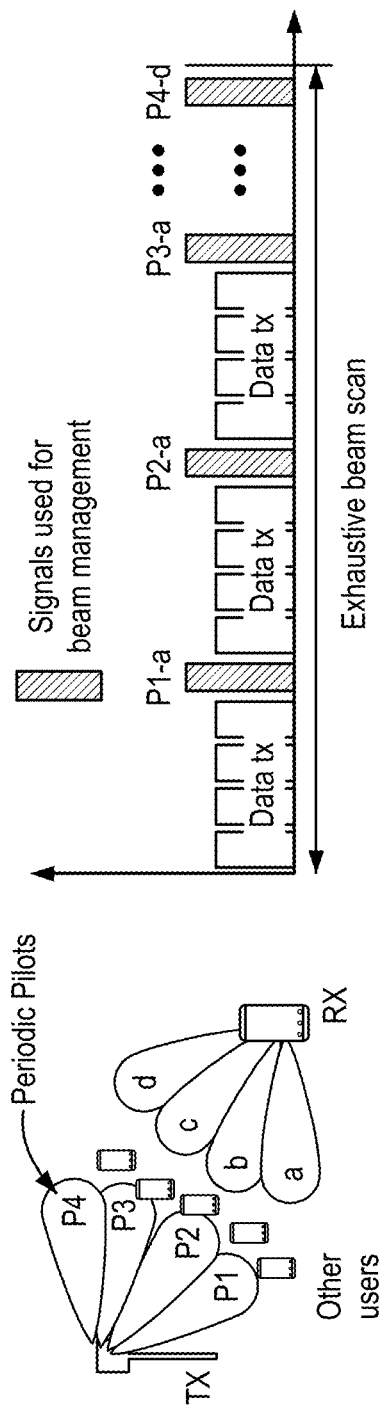
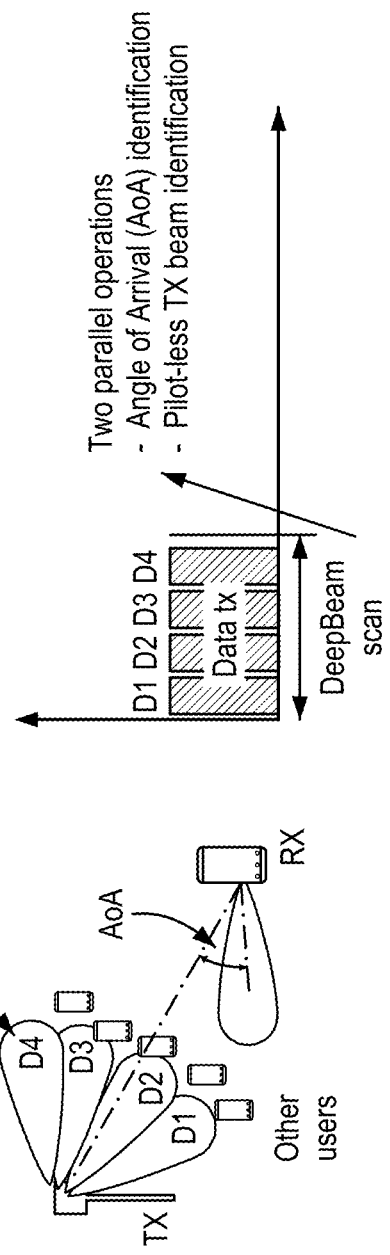
FIG. 1A PRIOR ART
FIG. 1B 12-beam, $L = 1$, Accuracy: 81.02%

12-beam, $L = 5$, Accuracy: 84.02%

24-beam, $L = 1$, Accuracy 68.77%

24-beam, $L = 5$, Accuracy: 77.46%

12-beam, $L = 1$ 12-beam $L = 5$ 24-beam, $L = 1$ 24-beam, $L = 5$

AoA, RX Ant. 0

AoA, RX Ant. 1

TOTA, AoA 12-beam, Accuracy: 62.69%

24-beam, Accuracy: 49.41%

AoA, Accuracy: 83.38%

24-beam, TX Ant. 0
Accuracy: 81.84%

12-beam, TX Ant. 0
Accuracy: 80.89%

AoA, RX Ant. 0
Accuracy: 92.95%

24-beam, TX Ant. 0
Accuracy: 84.69%

12-beam, TX Ant. 0
Accuracy: 84.41%

AoA, RX Ant. 0
Accuracy: 88.13%

Accuracy vs input size $K$.

Accuracy: 91.56%

COORDINATION-FREE MMWAVE BEAM MANAGEMENT WITH DEEP WAVEFORM LEARNING

CROSS REFERENCE TO RELATED APPLICATIONS

This application is a continuation of U.S. application Ser. No. 17/481,378, filed 22 Sep. 2021, now allowed, which claims benefit under 35 U.S.C. § 119(e) of U.S. Provisional Application No. 63/081,938, filed on 23 Sep. 2020. Each of the aforementioned priority applications is hereby incorporated by reference herein in its entirety.

STATEMENT REGARDING FEDERALLY SPONSORED RESEARCH OR DEVELOPMENT

This invention was made with government support under Grant Number CCF-1937500 and Grant Number CNS-1923789 awarded by the National Science Foundation. The government has certain rights in the invention.

BACKGROUND

Mobile devices require ever larger gigabit-per-second data rates. Thanks to their promise of data rates orders of magnitude higher than sub-6 GHz technologies, millimeter wave (mmWave) communications lie at the foundation of 5th generation (5G) networks and beyond. A challenge in mmWave networks is the severely increased path loss with respect to sub-6 GHz transmissions, which suggests that highly directional communications through beamforming are necessary to bring the transmission range back to acceptable levels. Consequently, the transmitter (TX) and the receiver (RX) need to coordinate to select the beam pair that yields the highest beamforming gain. For this reason, beam management in mmWave networks has attracted interest from the research community.

Beam management is usually a complex procedure that involves several time-consuming steps. First, both the TX and the RX need to discover each other by finding the initial beamforming vectors that yield a sufficient Signal-to-Noise-Ratio (SNR) to establish a mmWave link. This procedure is usually called initial access (IA). Once the mmWave link has been established, beam tracking is performed to keep the TX and RX beams aligned to avoid sudden drops in SNR. For both IA and beam tracking, the 3rd Generation Partnership Project (3GPP) NR standard for 5G communications utilizes synchronization signal blocks (SSBs), which are essentially pilot and synchronization sequences that are periodically transmitted by the TX in each of its $N_{tx}$ beam directions. By listening on each of its $M_{rx}$ beam directions, the RX is then able to compute the received power for each of the $N_{tx} \cdot M_{rx}$ possible beam combinations and thus make an informed decision on which beamforming vector to use. The complexity of these beam management techniques, also called exhaustive beam sweep (EBS), is thus quadratic in the number of beams. FIG. 1A shows an example of EBS when $N_{tx}=4$ and $M_{rx}=4$ beams are used. A similar procedure is used for IEEE 802.11ad, where the beams are distributed in $N_{tx} \leq 128$ sphere sectors, with beam widths as small as 3 degrees. A beam sweep is performed by the TX to find the best sector, and subsequently, intra-sector fine-tuning is used by the TX and RX to refine the selection.

This pilot-based EBS is very inefficient. For example, in 3GPP NR it could take up to 164 milliseconds (ms) to complete an IA when 24 beams are used by both TX and RX. Worse yet, although EBS procedures could be feasible in cellular networks, they may not be effective at all in mmWave ad hoc networks, where links are highly volatile and short in duration. Attempts to improve beam management still require a certain degree of coordination between the TX and RX, which reduces the effective channel utilization.

Beam management in mmWave networks has attracted significant interest from the research community over the last few years. However, much of this work requires some sort of coordination with the TX, which in turn introduces overhead. Regarding passive beam tracking, LiSteer, a mechanism using external light-emitting diodes (LEDs) located on the wireless Access Point (AP) has been proposed to track the user's movement. However, the mechanism requires additional equipment and may not work in many circumstances (i.e., visible light is present, mobile device inside the pocket, and so on). Moreover, it requires traditional beam sweeping at the AP side.

The application of deep learning to improve the performance of wireless communications is being used to address problems such as modulation recognition and radio fingerprinting. The interest in this technique comes from its versatility in addressing a wide variety of wireless classification problems where an explicit mathematical model is cumbersome to obtain (e.g., because of the phenomenon itself or due to the scale of the classification problem). System aspects of deep learning in wireless have also been investigated by Restuccia et al. to address real-time classification problems. (F. Restuccia and T. Melodia, "Big Data Goes Small: Real-Time Spectrum-Driven Embedded Wireless Networking Through Deep Learning in the RF Loop," *Proc. of IEEE Conf. on Computer Communications (INFOCOM)*, 2019; F. Restuccia and T. Melodia, "DeepWiERL: Bringing Deep Reinforcement Learning to the Internet of Self-Adaptive Things," *Proc. of IEEE Conf. on Computer Communications (INFOCOM)*, 2020) On the other hand, machine learning in the mmWave domain is still at its infancy, also due to the current lack of large-scale experimental databases. Existing relevant studies in the mmWave domain use either simulations or ray tracing, which may not entirely capture the complexity of real-life propagation scenarios at mmWave spectrum bands.

SUMMARY

Because of their highly directional transmissions, radios operating at millimeter wave (mmWave) frequencies need to perform beam management to establish and maintain reliable mmWave links. The technology described herein provides a framework (sometimes termed "DeepBeam" herein) for beam management in mmWave networks that does not require pilot sequences from the transmitter, nor any beam sweeping or synchronization from the receiver. This is achieved by inferring (i) the angle of arrival (AoA) of incoming transmissions, and (ii) the actual transmission beam being used by the transmitter through waveform-level deep learning on ongoing transmissions between the TX to other receivers. This is possible because different beam patterns introduce different "impairments" to the waveform, which can be subsequently learned by a trained classification module employing, for example, a convolutional neural network (CNN). The receiver can associate a quality metric, such as, without limitation, a reference signal received power (RSRP) value or a signal-to-noise-ratio (SNR), to the incoming transmissions without explicit coordination with the transmitter. The technology does not need to rely on explicit coordination between the transmitter (TX) and the receiver (RX), which would significantly reduce the airtime available for communication and further complicate the network protocol design.

Further embodiments, aspects, and features of the technology include the following:

1. A system for beam management in a wireless network, comprising:
a radio frequency receiver comprising an antenna array to receive incoming radio frequency (RF) transmissions; and
a processing system comprising:
receiver circuitry in communication with the radio frequency receiver to produce in-phase/quadrature (I/Q) input samples from the incoming RF transmissions, and
a learning module comprising a trained classification module operative to receive the I/Q input samples from the receiver circuitry and process the I/Q input samples to determine transmitted beam information of incoming RF transmissions, the learning module further comprising:
a beam inference engine to determine waveform characteristics of the incoming transmission beams, and
an angle of arrival engine operative to determine angles of arrival of the incoming RF transmissions on the antenna array;
wherein the processing system is further operative to select an incoming RF transmission and angle of arrival based on the determined waveform characteristics for beam management operations.

2. The system of 1, wherein the processing system includes a codebook that comprises a set of codewords corresponding to an identification of the incoming RF transmissions and is operative to select one of the incoming RF transmissions from an identified codeword.

3. The system of any of 1-2, wherein the processing system is further operative to associate a quality metric to each of the incoming RF transmissions, the quality metric comprising a received power value, a reference signal received power value, a received signal strength indicator, a reference signal received quality value, a signal-to-noise ratio, or a signal-to-noise-and-interference ratio.

4. The system of any of 1-3, wherein the processing system is further operative to rank the incoming RF transmissions by the or a quality metric associated with each of the incoming RF transmissions.

5. The system of any of 1-4, wherein the processing system is operative to match a selected incoming RF transmission at a selected angle of arrival to a synchronization signal block transmitting from a direction corresponding to the selected angle of arrival and corresponding time and frequency resources.

6. The system of any of 1-5, wherein the processing system includes a protocol stack including a physical layer and a medium access control layer, and the learning module is in communication with one or both of the physical layer and the medium access control layer to receive an activation command to trigger the learning module to process the I/Q samples.

7. The system of any of 1-6, wherein the processing system includes a protocol stack including a physical layer and a medium access control layer, and the learning module is in communication with one or both of the physical layer and the medium access control layer to transmit the determined transmitted beam information to the protocol stack.

8. The system of any of 1-7, wherein the waveform characteristics include one or more of average frequency, median frequency, kurtosis, skewness, cyclic moment, amplitude, frequency bandwidth, center frequency, energy level, energy rate, and power level, transmission frequency bandwidth, reception frequency bandwidth, center frequency, transmission frequency, reception frequency, local oscillator frequency, sampling speed, symbol modulation scheme, modulation rate, coding rate, error correction scheme, transmission rate, transmission channel, data rate, energy rate, signal power, finite impulse response (FIR) filter tap, channel quality, signal to noise ratio, signal to interference-plus-noise ratio, medium access control (MAC) protocols, routing protocols, transport layer protocols, and application layer protocols.

9. The system of any of 1-8, wherein the waveform characteristics include one or more of a symbol modulation scheme, frequency value, phase value, amplitude value, symbol modulation rate, fast Fourier transform size, carrier frequency, bandwidth, frequency resolution, number of carriers, and bandwidth of carriers.

10. The system of any of 1-9, wherein the processing system is operative to determine the waveform characteristics from signals transmitted using a digital modulation scheme.

11. The system of any of 1-10, wherein the digital modulation scheme comprises phase-shift keying, binary phase-shift keying, quadrature phase-shift keying, 8-phase-shift keying, 16-phase-shift keying, frequency-shift keying, amplitude-shift keying, quadrature amplitude modulation, or orthogonal frequency division multiplexing.

12. The system of any of 1-11, wherein the trained classification module is trained to recognize transitions between occurrences of the I/Q input samples in an I/Q complex plane.

13. The system of any of 1-12, wherein the trained classification module has been trained with inputs of in-phase samples and quadrature samples to recognize one or more of the waveforms.

14. The system of any of 1-13, wherein the trained classification module comprises a trained deep learning neural network including a plurality of neural network layers, operative to receive the I/Q input samples from the incoming transmissions and process the I/Q input samples through the neural network layers.

15. The system of any of 1-14, wherein the trained classification module comprises a deep learning neural network comprising a convolutional neural network, a multi-layer perceptron, a feedforward network, a recurrent neural network, a long-short term memory neural network, or a support vector machine.

16. The system of any of 1-15, wherein the trained classification module comprises a deep learning neural network comprising a plurality of neural network layers, the neural network layers including one or more of a convolution layer, a dense layer, a fully-connected layer, a rectified linear layer, and a pooling layer.

17. The system of any of 1-16, wherein the neural network layers are configured with one or more of a weight, filter, bias, or activation function.

18. The system of any of 1-17, wherein the learning module comprises learning circuitry including one or more logic devices.

19. The system of any of 1-18, wherein the learning module comprises one or more logic devices, the logic devices including one or more of a field programmable gate array (FPGA), application specific integrated circuit (ASIC), complex programmable logic device (CPLD), small-scale integrated circuit, programmable logic array, programmable logic device, masked-programmed gate array, arithmetic logic block, arithmetic logic operator, register, finite state machine, multiplexer, accumulator, comparator, counter, look-up table, gate, latch, flip-flop, input port, output port, carry in port, carry out port, parity generator, logic unit, and logic cell.

20. The system of any of 1-19, wherein the processing system is configured as a system-on-chip on a substrate.

21. The system of any of 1-20, wherein the processing system is operative to carry out the beam management operations including providing initial access to a transmitter, tracking of transmissions from one or more transmitters, and discovery of neighboring transmitters and receivers.

22. The system of any of 1-21, wherein the processing system is operative to receive incoming transmissions having a frequency of at least 450 MHz.

23. The system of any of 1-22, wherein the processing system is operative to receive incoming transmissions having a frequency ranging from 450 MHz to 86 GHz, from 450 MHz to 6 GHz, from 25.250 GHz to 52.600 GHz, from 64 GHz to 86 GHz, greater than 450 MHz, or greater than 6 GHz.

24. The system of any of 1-23, wherein the processing system is operative to receive incoming transmissions having a wavelength ranging from 1 mm to 10 mm.

25. The system of any of 1-24, wherein the incoming transmissions include data transmissions or transmissions including synchronization signals or both.

26. The system of any of 1-25, further comprising a radio frequency transmitter located at a same node with the radio frequency receiver and in communication with the processing system and operative to transmit radio frequency signals at an angle corresponding to the selected angle of arrival.

27. The system of any of 1-26, further comprising a radio frequency transmitter located remotely from the radio frequency receiver and operative to transmit the RF transmissions at a variety of angles of arrival.

28. A method for beam management in a wireless network, comprising:
    detecting, at a radio frequency (RF) receiver including an antenna array and a processing system, incoming radio frequency (RF) transmissions from a transmitter;
    producing in-phase/quadrature (I/Q) symbols from the incoming RF transmissions;
    inputting to a learning module in-phase/quadrature (I/Q) input samples from the incoming RFv transmissions;
    determining, by the learning module, waveform characteristics of incoming RF transmissions and angles of arrival of the incoming transmissions on the antenna array; and
    selecting an incoming RF transmission based on the angle of arrival and the waveform characteristics for beam management operations.

29. The method of 28, further comprising performing one or more of the beam management operations, including providing initial access to a transmitter, tracking of transmissions from one or more transmitters, and discovery of neighboring transmitters and receivers.

30. The method of any of 28-29, further comprising, from a radio frequency transmitter located at a same node with the radio frequency receiver, transmitting radio frequency signals at an angle corresponding to the selected angle of arrival.

31. The method of any of 28-30, further comprising selecting one of the incoming RF transmissions from an identified codeword in a codebook that comprises a set of codewords corresponding to an identification of the incoming transmission beams.

32. The method of any of 28-31, further comprising associating a quality metric to each of the incoming RF transmissions, the quality metric comprising a received power value, a reference signal received power value, a received signal strength indicator, a reference signal received quality value, a signal-to-noise ratio, or a signal-to-noise-and-interference ratio.

33. The method of any of 28-32, further comprising ranking the incoming RF transmissions by the or a quality metric associated with each of the incoming RF transmissions.

34. The method of any of 28-33, further comprising matching a selected incoming RF transmissions at a selected angle of arrival to a synchronization signal block transmitting from a direction corresponding to the selected angle of arrival and corresponding time and frequency resources.

35. The method of any of 28-34, further comprising receiving, from a protocol stack including a physical layer and a medium access control layer, an activation command to trigger the learning module to process the I/Q samples.

36. The method of any of 28-35, wherein the learning module comprises:
    a beam inference engine to determine the waveforms of the incoming RF transmissions, and
    an angle of arrival engine operative to determine the angles of arrival of the incoming RF transmissions on the antenna array; and
    the learning module is in communication with one or both of a physical layer and a medium access control layer of a protocol stack to transmit the determined transmitted beam information to the protocol stack.

37. The method of any of 28-36, wherein the waveform characteristics include one or more of average frequency, median frequency, kurtosis, skewness, cyclic moment, amplitude, frequency bandwidth, center frequency, energy level, energy rate, and power level, transmission frequency bandwidth, reception frequency bandwidth, center frequency, transmission frequency, reception frequency, local oscillator frequency, sampling speed, symbol modulation scheme, modulation rate, coding rate, error correction scheme, transmission rate, transmission channel, data rate, energy rate, signal power, finite impulse response (FIR) filter tap, channel quality, signal to noise ratio, signal to interference-plus-noise ratio, medium access control (MAC) protocols, routing protocols, transport layer protocols, and application layer protocols.

38. The method of any of 28-37, wherein the waveform characteristics include one or more of a symbol modulation scheme, frequency value, phase value, amplitude value, symbol modulation rate, fast Fourier transform size, carrier frequency, bandwidth, frequency resolution, number of carriers, and bandwidth of carriers.

39. The method of any of 28-38, further comprising determining the waveform characteristics from signals transmitted using a digital modulation scheme.

40. The method of any of 28-39, wherein the digital modulation scheme comprises phase-shift keying, binary phase-shift keying, quadrature phase-shift keying, 8-phase-shift keying, 16-phase-shift keying, frequency-shift keying, amplitude-shift keying, quadrature amplitude modulation, or orthogonal frequency division multiplexing.

41. The method of any of 28-40, further comprising recognizing transitions between occurrences of the I/Q input samples in an I/Q complex plane.

42. The method of any of 28-41, wherein the learning module comprises the trained classification module including a trained deep learning neural network including a plurality of neural network layers, operative to receive the I/Q input samples from the incoming transmissions and process the I/Q input samples through the neural network layers.

43. The method of any of 28-42, wherein the trained classification module comprises a deep learning neural network comprising a convolutional neural network, a multilayer perceptron, a feedforward network, a recurrent neural network, a long-short term memory neural network, or a support vector machine.

44. The method of any of 28-43, wherein the trained classification module comprises a deep learning neural network comprising a plurality of neural network layers, the neural network layers including one or more of a convolution layer, a dense layer, a fully-connected layer, a rectified linear layer, and a pooling layer.

45. The method of any of 28-44, wherein the neural network layers are configured with one or more of a weight, filter, bias, or activation function.

46. The method of any of 28-45, wherein the learning module comprises learning circuitry including one or more logic devices.

47. The method of any of 28-46, wherein the learning module comprises one or more logic devices, the logic devices including one or more of a field programmable gate array (FPGA), application specific integrated circuit (ASIC), complex programmable logic device (CPLD), small-scale integrated circuit, programmable logic array, programmable logic device, masked-programmed gate array, arithmetic logic block, arithmetic logic operator, register, finite state machine, multiplexer, accumulator, comparator, counter, look-up table, gate, latch, flip-flop, input port, output port, carry in port, carry out port, parity generator, logic unit, and logic cell.

48. The method of any of 28-47, further comprising receiving incoming transmissions having a frequency of at least 450 MHz.

49. The method of any of 28-48, further comprising receiving incoming transmissions having a frequency ranging from 450 MHz to 86 GHz, from 450 MHz to 6 GHz, from 25.250 GHz to 52.600 GHz, from 64 GHz to 86 GHz, greater than 450 MHz, or greater than 6 GHz.

50. The method of any of 28-49, further comprising receiving incoming transmissions having a wavelength ranging from 1 mm to 10 mm.

51. The method of any of 28-50, wherein the incoming transmissions include data transmissions or transmissions including synchronization signals or both.

DESCRIPTION OF THE DRAWINGS

FIG. 1A illustrates a prior art pilot-based exhaustive beam sweep (EBS). In this example, with the EBS, the TX and RX scan 4 beams each, by transmitting pilots P1-P4 on different transmitter's beams (TXBs), and by receiving with beams a-d, respectively, in specific time and frequency resources.

FIG. 1B illustrates an embodiment of a transmission beam management system, in which the RX obtains the same information by passively eavesdropping on data transmissions to other users in the network and processing the raw waveform with deep learning to infer the Angle of Arrival (AoA) and the TXB.

In FIG. 3A and FIG. 3B, a CNN processes the baseband I/Q samples to infer, respectively, the TXB used by the TX and the AoA. Then, FIG. 3C visually represents the final beam pair selection based on the inferred TXB and AoA.

In FIG. 6A, vehicle 1 is communicating with vehicle 3, vehicle 2 with vehicle 4. Using DeepBeam, vehicles 1 and 4 infer the reciprocal AoA by passively eavesdropping ongoing data transmissions. In FIG. 6B, vehicles 1 and 4 can steer the transmission beam toward each other when they need to exchange data.

(in FIG. 15B) actual beam vs. predicted beam for the 24-beam codebook; and (in FIG. 15C) actual AoA vs. predicted AoA.

(in FIG. 16B) actual beam vs. predicted beam for the 12-beam codebook, TX antenna 0; (in FIG. 16C) actual AoA vs. predicted AoA for RX antenna 0; (in FIG. 16D) actual beam vs. predicted beam for the 24-beam codebook, TX Antenna 0; (in FIG. 16E) actual beam vs. predicted beam for the 12-beam codebook, TX Antenna 0; and (in FIG. 16F) actual AoA vs. predicted AoA for RX Antenna 0.

DETAILED DESCRIPTION

Figure 2:
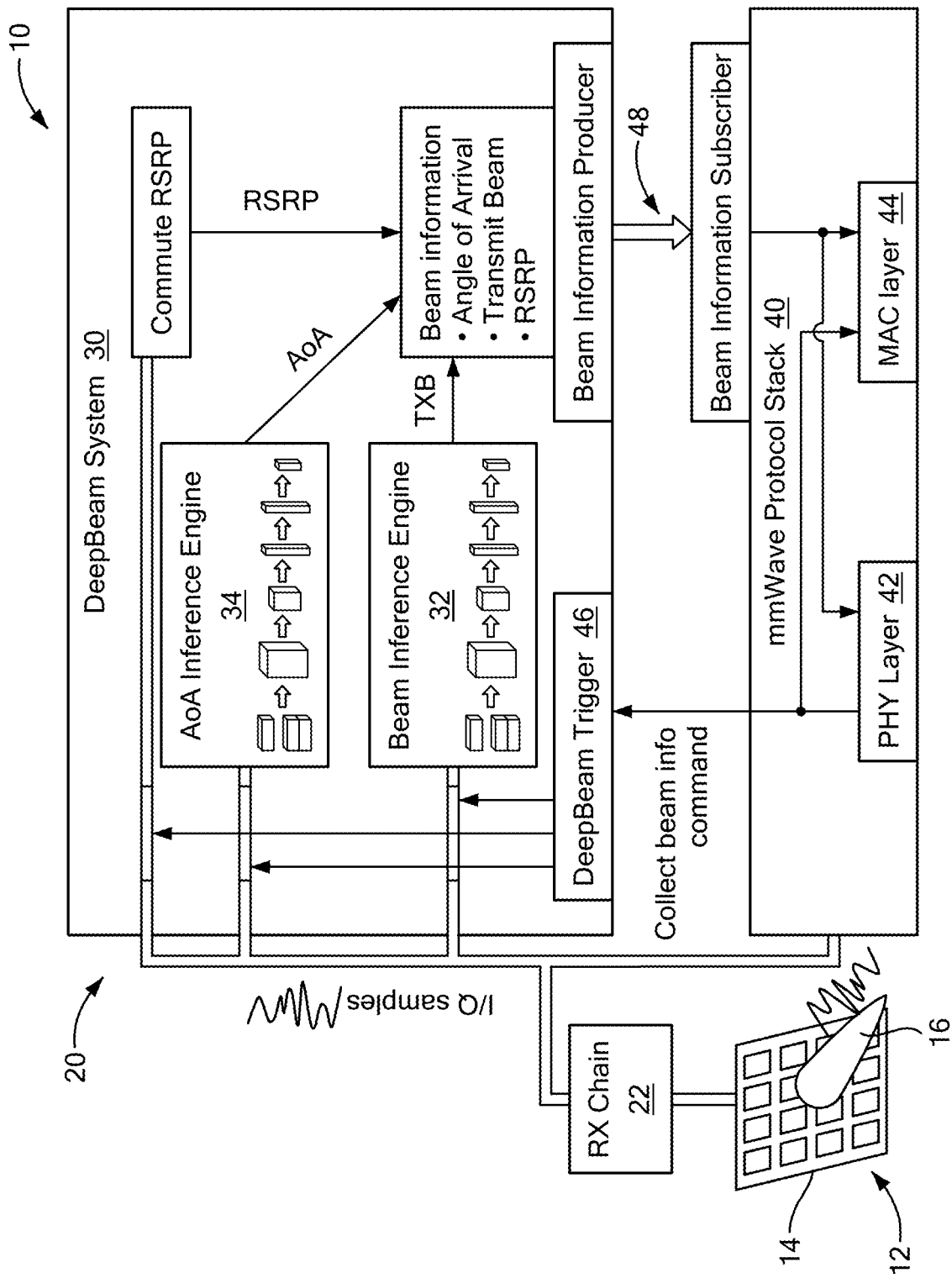
FIG. 2 illustrates an embodiment of the system employing a processing system, termed "DeepBeam" herein. An RX chain converts an analog waveform impinging on a phased array into digital I/Q samples, which are processed by the PHY and MAC layers and by DeepBeam. The I/Q samples are fed to two inference engines, which classify the TXB and AoA and estimate a quality metric, such as the reference signal received power (RSRP). The mmWave protocol stack connects to DeepBeam through two interfaces, a trigger, to activate the DeepBeam inference, and a data source, to obtain the TXB, AoA, and RSRP.

Because of their highly directional transmissions, radios operating at millimeter wave (mmWave) frequencies need to perform beam management to establish and maintain reliable mmWave links. To achieve this objective, existing solutions mostly rely on explicit coordination between the transmitter (TX) and the receiver (RX), which significantly reduces the airtime available for communication and further complicates the network protocol design. The technology described herein presents a framework (sometimes termed "DeepBeam" herein) for beam management in mmWave networks that does not require pilot sequences from the transmitter, nor any beam sweeping or synchronization from the receiver. The technology provides embodiments of systems and methods for inferring (i) the angle of arrival (AoA) of incoming transmissions, and (ii) the actual transmission beam being used by the transmitter through waveform-level deep learning on ongoing transmissions between the TX to other receivers. This is possible because different beam patterns introduce different "impairments" to the waveform, which can be subsequently learned by a trained classifier such as a convolutional neural network (CNN). A quality metric such as, without limitation, a reference signal received power value or a signal-to-noise ratio, can be associated with the incoming transmission beams without explicit coordination with a transmitter.

By way of further description, 5G networks also use frequencies in the 24-52 GHz range, as there are large chunks of bandwidth that can be allocated to mobile operators to provide high data rates to the mobile users. Signals at such high frequencies, however, do not propagate as far as those in the traditional spectrum used in mobile networks (i.e., below 6 GHz). A solution to this problem is to focus the transmitted energy in narrow beams, so that the distance the signal can travel increases. This, in turn, introduces a new networking problem: the transmitter and the receiver need to point these narrow beams toward each other, otherwise they would be deaf to ongoing transmissions and would not be able to communicate. This usually involves a multi-step procedure in which the transmitter and receiver scan different angular directions until they find the other endpoint, exchanging control signaling. The literature and the standards (e.g., 3GPP NR, IEEE 802.11ad/ay) have identified several methods to do this, but they all require some level of coordination between the transmitter and the receiver, and the usage of specific signals (pilots) from the transmitter side. This introduces delays (for example, to establish the link the first time the transmitter and receiver communicate, or to update the pointing directions when one of the two endpoints moves) and overhead (because fewer resources are allocated for data transmissions).

The technology described herein does not use pilots or need explicit coordination between the transmitter and the receiver. In this technology, the receiver passively scans data transmissions to other users in the network (without overhead) and learns (using a deep neural network) the set of beams used by the transmitter, associating a quality metric to each of these beams. At the same time, it learns which is the direction of the transmitter with respect to the receiver. Using these two pieces of information, the receiver can select what is the best pair of beams (one for the transmitter, one for the receiver) to be used for the communications. The technology can reduce the latency and the overhead of such procedure. Moreover, it relies on low-level signals from the antenna arrays, which do not need to be processed by the protocol stack of the devices. This makes the technology versatile and deployable with any mmWave networking standard.

More particularly, ongoing transmissions are leveraged between the TX to other receivers, and through waveform-level deep learning (i) the AoA of the TXB; and (ii) the waveform of the TXB itself are inferred. By using these two pieces of information, the RX can infer how to switch its beam toward the TX and can inform the TX of which is the best beam to be used for communications with the RX, without the need for explicit pilots. FIG. 1B summarizes at a high level why this approach is able to decrease the time taken to identify the best beams to be used for the ongoing mmWave links by doing away with pilot-based scanning. In comparison to FIG. 1A, it can be seen that two parallel operations, identification of the angle of arrival (AoA) and pilot-less TX beam identification, can be performed in less time. As explained further below, in some embodiments, DeepBeam's inference engine can be based on convolutional neural networks (CNNs), which can be effective for inference and classification in the radio frequency (RF) domain, while also meeting real-time constraints.

I. The Deepbeam System

A system and method for beam management in a wireless network (the DeepBeam system) is described with reference to the embodiment illustrated in FIG. 2. The system 10 includes a radio frequency receiver 12 comprising an antenna array 14 to receive incoming radio frequency (RF) transmissions 16. A processing system 20 includes receiver circuitry 22 in communication with the radio frequency receiver to produce in-phase/quadrature (I/Q) input samples from the incoming RF transmissions. A learning module 30 including a trained classification module can receive the I/Q input samples from the receiver circuitry and process the I/Q input samples to determine transmitted beam information of incoming RF transmissions. The learning module includes a beam inference engine 32 to determine waveform characteristics of the incoming RF transmissions. The learning module also includes an angle of arrival engine 34 operative to determine angles of arrival of the incoming RF transmissions on the antenna array. The processing system can select an incoming RF transmission and angle of arrival based on the determined waveform characteristics for beam management operations.

In some embodiments, the DeepBeam system be a standalone module that can be plugged into the physical (PHY) layer 42 and medium access control (MAC) layer 44 of a generic mmWave protocol stack 40. In other words, it does not rely on any specific feature of, for example, 3GPP NR or IEEE 802.11ad/ay. The DeepBeam system architecture can be implemented in software, hardware, such as on FPGAs, and/or firmware to provide real-time learning with latency guarantees. DeepBeam can be easily integrated with the PHY and MAC layers through two interfaces 46, 48, as shown in FIG. 2. The first interface 46 represents a trigger that activates the DeepBeam engine when required by the protocol stack. The second interface 48 can be, for example, a producer/subscriber interface to which the wireless stack can subscribe to consume the information generated by DeepBeam at its own convenience. This data comprises a list of tuples with three elements, i.e., the AoA and one or more waveforms of the TXB, both inferred through deep learning, and an associated quality metric. The quality metric can include, without limitation, a received power value, a reference signal received power (RSRP) value, a received signal strength indicator, a reference signal received quality value, a signal-to-noise ratio (SNR), or a signal-to-noise-and-interference ratio (SINR). In some embodiments, the quality metric can be a reference signal received power (RSRP) value, a metric that is typically used to evaluate the quality of a received signal. RSRP can be determined by an average of the received power over a bandwidth of a transmitted beam. In some embodiments, the quality can be a signal-to-noise ratio.

The input to DeepBeam includes the raw digital waveform obtained through the receiver RF chain, i.e., the in-phase and quadrature (I/Q) data sampled by an analog to digital converter (ADC), without any further processing (e.g., frequency offset tracking, equalization) from the PHY layer. This means that the module can be directly connected to the device RF chain, and that there is no need for synchronization between the transmitter and the receiver, as DeepBeam can handle the I/Q samples even before they are processed at the PHY layer. Therefore, a device equipped with DeepBeam can passively eavesdrop transmissions in a certain area, and thus collect statistics on the channel quality associated with the beams that a base station or access point uses to communicate with other users, eventually inferring what is the best beam pair to use for communications.

DeepBeam employs a learning module that can include a trained classification module to receive the I/Q input samples and process the I/Q input samples to determine the transmitted beam information of the incoming transmission. The learning module can include a beam inference engine 32 to determine waveforms of the incoming transmission beams, and an angle of arrival inference engine 34 to determine an angle of arrival of the incoming transmission beams on the antenna array. The trained classification module can be trained with inputs of in-phase samples and quadrature samples from incoming RF transmissions to recognize one or more of the waveforms. The trained classification module can include a trained deep learning neural network including a plurality of neural network layers, operative to receive the I/Q input samples from the incoming transmission beams and process the I/Q input samples through the neural network layers. The trained classification module can include a deep learning neural network comprising, without limitation, a convolutional neural network (CNN), a multi-layer perceptron, a feedforward network, a recurrent neural network, a long-short term memory neural network, or a support vector machine. Examples of communication systems that employ deep learning to receive and process I/Q samples can be found in U.S. patent application Ser. No. 16/591,772 and International Publication No. WO/2020/236236, incorporated by reference herein.

Figure 3A:
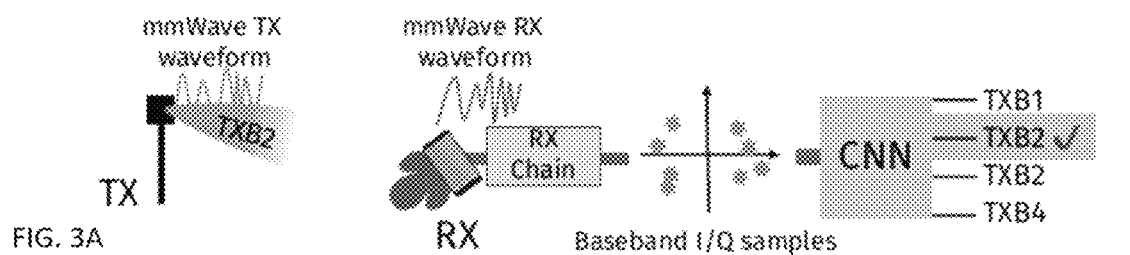
FIGS. 3A, 3B and 3C illustrate an embodiment of (in FIG. 3A) TXB and (in FIG. 3B) AoA learning.
Figure 3B:
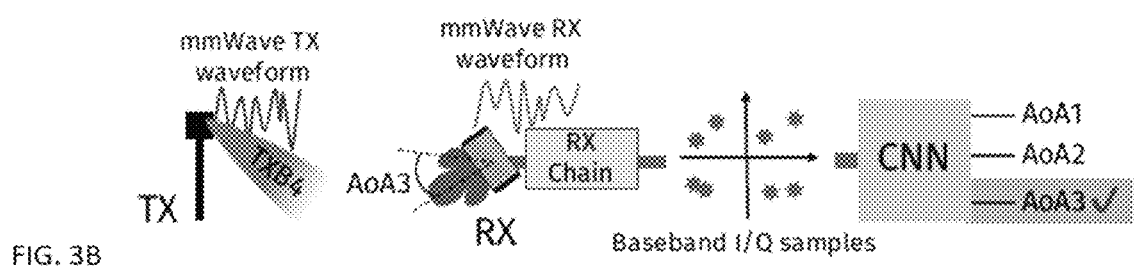

In some embodiments, the two learning engines at the core of the DeepBeam learning module can be based on CNNs and use the I/Q samples to infer two elements for beam management procedures, namely waveforms of the TXB and AoA. As noted above, in prior art systems, these are usually obtained through a pilot-based beam sweep or inference at the transmitter and receiver. DeepBeam, instead, can perform the inference on any kind of over-the-air signal, thus speeding up beam management procedures, as described further below. The AoA, as shown in FIGS. 3A and 3B, corresponds to the angle with which the received signal impinges on the antenna array of the receiver, either through the direct path between the transmitter and the receiver, when in Line-of-Sight (LOS), or through a reflected path, in Non-Line-of-Sight (NLOS). Thanks to this information, the RX can steer the receive beam toward this angular direction to experience the highest beamforming gain. This is illustrated, as an example, in FIG. 3B the RX identifies that the AoA is AoA3, corresponding to, in this case, 45°, and exploits this information to select the matching receive beam.

Figure 3C:
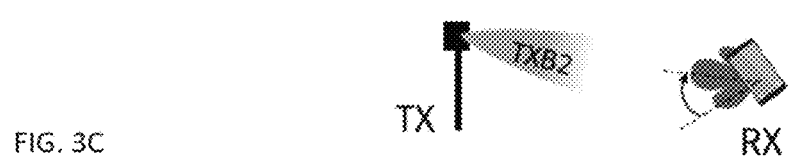

In some embodiments, DeepBeam can also infer through deep learning which beam—from a certain codebook—is being used by the TX to transmit the waveform just sampled, as shown in FIG. 3C. Once the DeepBeam-equipped device has eavesdropped on enough ongoing transmissions, it can determine which is the best beam that the TX should use to communicate with it, for example, by ranking the inferred TXBs by the associated RSRP. Several techniques can also be integrated in DeepBeam to minimize the number of transmissions to observe. To this end, it can be pointed out that the pilot-less estimation that DeepBeam enables can be considered as a basis for further refinement of fast and efficient beam management schemes. The information regarding the best TXB can then be used in different ways during the beam management process. For example, in 3GPP NR, the mobile device can infer with DeepBeam the best TXB, and then match it with the next synchronization signal block (SSB) in the same angular direction to perform initial access in the proper time and frequency resources.

As described above, in some embodiments, the DeepBeam learning module can leverage a CNN to perform real-time beam inference. CNNs are useful because of their demonstrated performance in addressing complex classification problems in the wireless domain, including modulation classification and radio fingerprinting. The versatility of CNNs is primarily owed to the fact that the filters in the convolutional layers learn patterns in the I/Q constellation plane regardless of where they occur in the waveform (shift invariance). This ultimately helps distinguish waveforms far beyond what is possible with traditional dense networks, which were shown to not perform well in RF classification task. Furthermore, as discussed earlier, CNNs are amenable to be implemented in FPGA and integrated in the baseband processing loop, and are easily fine-tunable.

Figure 4:
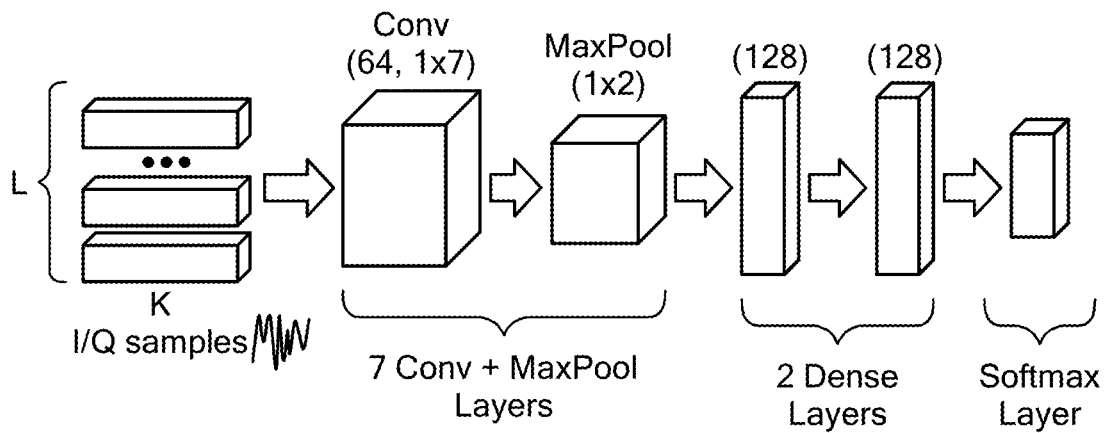
FIG. 4 illustrates an embodiment of a trained classification module employing a baseline architecture of a convolutional neural network, a CNN, sometimes termed "BeamNet" herein. The input is given by K I/Q samples grouped in L blocks.

In some embodiments, the BeamNet CNN architecture is as illustrated in FIG. 4, which is called baseline. This architecture is referred to herein, if not explicitly mentioned otherwise. The baseline has been adapted from the architecture presented in O'Shea et al. 2018 (incorporated herein by reference), which has been effective for RF classification tasks. (T. J. O'Shea, T. Roy, and T. C. Clancy, "Over-the-Air Deep Learning Based Radio Signal Classification," *IEEE J. Sel. Topics Signal Process*, vol. 12, pp. 168-179, February 2018) BeamNet classifies input tensors of size (L, K, 2), where L is the number of consecutive input blocks, each composed of K I/Q samples. By increasing the number of blocks, BeamNet can more likely recognize the I/Q patterns in the constellation. The input is further processed by 7 convolutional (Conv) layers, each followed by a maximum pooling (MaxPool) layer with filters of size 1×2, which ultimately reduce the output dimension of each Conv layer in half. Two dense layers follow the Conv+MaxPool layers, and finally a Softmax layer to obtain the probability of each beam.

The beam management system and method described herein can be implemented with any suitable hardware, software, and or firmware components. For example, a radio frequency receiver can include any suitable antenna array to receive incoming RF transmissions and transmission beams, such as one or more patch antennas of any suitable geometric configuration. The receiver can include other suitable components such as an analog to digital converter (ADC) and local oscillator. The receiver can produce streams of I/Q samples at a desired rate for the processing system.

The processing system can include any suitable trained classifier or trained classification module. The trained classifier or trained classification module can include a deep learning neural network, such as a convolutional neural network, a multi-layer perceptron, a feedforward network, a recurrent neural network, a long-short term memory neural network, or a support vector machine. A deep learning neural network can include a plurality of neural network layers, such as, without limitation, one or more of a convolution layer, a dense layer, a fully-connected layer, a rectified linear layer, and a pooling layer. The neural network layers can be configured with one or more of a weight, filter, bias, or activation function.

The processing system can determine waveforms including, without limitation, one or more of average frequency, median frequency, kurtosis, skewness, cyclic moment, amplitude, frequency bandwidth, center frequency, energy level, energy rate, and power level, transmission frequency bandwidth, reception frequency bandwidth, center frequency, transmission frequency, reception frequency, local oscillator frequency, sampling speed, symbol modulation scheme, modulation rate, coding rate, error correction scheme, transmission rate, transmission channel, data rate, energy rate, signal power, finite impulse response (FIR) filter tap, channel quality, signal to noise ratio, signal to interference-plus-noise ratio, medium access control (MAC) protocols, routing protocols, transport layer protocols, and application layer protocols. The waveforms can include, without limitation, one or more of a symbol modulation scheme, frequency value, phase value, amplitude value, symbol modulation rate, fast Fourier transform size, carrier frequency, bandwidth, frequency resolution, number of carriers, and bandwidth of carriers.

The processing system can determine waveforms from signals transmitted using a digital modulation scheme. A digital modulation scheme can include, without limitation, phase-shift keying, binary phase-shift keying, quadrature phase-shift keying, 8-phase-shift keying, 16-phase-shift keying, frequency-shift keying, amplitude-shift keying, quadrature amplitude modulation, or orthogonal frequency division multiplexing.

The beam management system described herein can be implemented in conjunction with a computing device that includes a combination of hardware, software, and firmware that allows the computing device to run an application layer or otherwise perform various processing tasks. Computing devices can include without limitation personal computers, workstations, servers, laptop computers, tablet computers, mobile devices, wireless devices, smartphones, wearable devices, embedded devices, microprocessor-based devices, microcontroller-based devices, programmable consumer electronics, mini-computers, main frame computers, and the like and combinations thereof.

The computing device can include a basic input/output system (BIOS) and an operating system as software to manage hardware components, coordinate the interface between hardware and software, and manage basic operations such as start up. The computing device can include one or more processors and memory that cooperate with the operating system to provide basic functionality for the computing device. The operating system provides support functionality for the applications layer and other processing tasks. The computing device can include a system bus or other bus (such as memory bus, local bus, peripheral bus, and the like) for providing communication between the various hardware, software, and firmware components and with any external devices. Any type of architecture or infrastructure that allows the components to communicate and interact with each other can be used.

Processing tasks can be carried out by one or more processors. Various types of processing technology can be used including a single processor or multiple processors, a central processing unit (CPU), multicore processors, parallel processors, or distributed processors. Additional specialized processing resources such as graphics (e.g., a graphics processing unit or GPU), video, multimedia, or mathematical processing capabilities can be provided to perform certain processing tasks. Processing tasks can be implemented with computer-executable instructions, such as application programs or other program modules, executed by the computing device. Application programs and program modules can include routines, subroutines, programs, scripts, drivers, objects, components, data structures, and the like that perform particular tasks or operate on data.

Processors can include one or more logic devices, such as small-scale integrated circuits, programmable logic arrays, programmable logic devices, masked-programmed gate arrays, field programmable gate arrays (FPGAs), application specific integrated circuits (ASICs), and complex programmable logic devices (CPLDs). Logic devices can include, without limitation, arithmetic logic blocks and operators, registers, finite state machines, multiplexers, accumulators, comparators, counters, look-up tables, gates, latches, flip-flops, input and output ports, carry in and carry out ports, and parity generators, and interconnection resources for logic blocks, logic units and logic cells.

The computing device includes memory or storage, which can be accessed by the system bus or in any other manner. Memory can store control logic, instructions, and/or data. Memory can include transitory memory, such as cache memory, random access memory (RAM), static random access memory (SRAM), main memory, dynamic random access memory (DRAM), block random access memory (BRAM), and memristor memory cells. Memory can include storage for firmware or microcode, such as programmable read only memory (PROM) and erasable programmable read only memory (EPROM). Memory can include non-transitory or nonvolatile or persistent memory such as read only memory (ROM), one time programmable non-volatile memory (OTPNVM), hard disk drives, optical storage devices, compact disc drives, flash drives, floppy disk drives, magnetic tape drives, memory chips, and memristor memory cells. Non-transitory memory can be provided on a removable storage device. A computer-readable medium can include any physical medium that is capable of encoding instructions and/or storing data that can be subsequently used by a processor to implement embodiments of the systems and methods described herein. Physical media can include floppy discs, optical discs, CDs, mini-CDs, DVDs, HD-DVDs, Blu-ray discs, hard drives, tape drives, flash memory, or memory chips. Any other type of tangible, non-transitory storage that can provide instructions and/or data to a processor can be used in the systems and methods described herein.

The computing device can include one or more input/output interfaces for connecting input and output devices to various other components of the computing device. Input and output devices can include, without limitation, keyboards, mice, joysticks, microphones, cameras, webcams, displays, touchscreens, monitors, scanners, speakers, and printers. Interfaces can include universal serial bus (USB) ports, serial ports, parallel ports, game ports, and the like.

The computing device can access a network over a network connection that provides the computing device with telecommunications capabilities. Network connection enables the computing device to communicate and interact with any combination of remote devices, remote networks, and remote entities via a communications link. The communications link can be any type of communication link including without limitation a wired or wireless link. For example, the network connection can allow the computing device to communicate with remote devices over a network which can be a wired and/or a wireless network, and which can include any combination of intranet, local area networks (LANs), enterprise-wide networks, medium area networks, wide area networks (WANS), virtual private networks (VPNs), the Internet, cellular networks, and the like. Control logic and/or data can be transmitted to and from the computing device via the network connection. The network connection can include a modem, a network interface (such as an Ethernet card), a communication port, a PCMCIA slot and card, or the like to enable transmission to and receipt of data via the communications link. A transceiver can include one or more devices that both transmit and receive signals, whether sharing common circuitry, housing, or a circuit boards, or whether distributed over separated circuitry, housings, or circuit boards, and can include a transmitter-receiver.

The computing device can include a browser and a display that allow a user to browse and view pages or other content served by a web server over the communications link. A web server, server, and database can be located at the same or at different locations and can be part of the same computing device, different computing devices, or distributed across a network. A data center can be located at a remote location and accessed by the computing device over a network.

The computer system can include architecture distributed over one or more networks, such as, for example, a cloud computing architecture. Cloud computing includes without limitation distributed network architectures for providing, for example, software as a service (SaaS), infrastructure as a service (IaaS), platform as a service (PaaS), network as a service (NaaS), data as a service (DaaS), database as a service (DBaaS), desktop as a services (DaaS), backend as a service (BaaS), test environment as a service (TEaaS), API as a service (APIaaS), and integration platform as a service (IPaaS).

The technology can provide good and consistent results when tested on different radios with different beamforming architectures. The technology can be implemented in software and/or hardware logic devices, such as on a field programmable gate array (FPGA), application specific integrated circuit (ASIC), or the like.

The technology can be effective in ad hoc scenarios, where most of the prior work assumes the usage of external information to perform beam management. It can allow the creation of devices with an improved communications performance. It can enable directional communications at mmWaves without coordination in vehicular and other ad hoc scenarios, without need for out-of-band information (e.g., GPS location). It can reduce the time required to establish a link at mmWave frequencies, which is useful in dynamic scenarios (e.g., vehicular and other ad hoc networks), where the configuration of the network may change before traditional beam management schemes are able to complete their execution. It can perform more prompt and responsive tracking of the best communication configuration for mmWave links and can reduce the overhead of control with respect to data transmissions.

The technology described herein is passive and does not need any information exchange with the TX. The technology is standard-agnostic and antenna-agnostic and can be utilized at both the TX side and the RX side. The technology can utilize experimental real-world data to address a practical deep learning problem in the mmWave domain.

The technology can be used in a number of applications. For example, it can be used for beam management for cellular networks operating at mmWaves, such as 3GPP NR, 5G, and beyond. It can be used for beam management in ad hoc and vehicular networks at mmWaves. It can be used for passive eavesdropping and classification of over-the-air mmWave radio signals. It can be used with 5G mobile devices (smartphones, virtual reality (VR) headsets, and the like) and connected vehicles operating at mmWaves.

II. Deepbeam Use Cases

As described above, DeepBeam is independent from the specific wireless protocol stack, since it relies on unprocessed I/Q samples and thus can be used for any beam management operation (i.e., initial access, beam tracking, neighbor discovery). To provide a concrete example of the effectiveness of DeepBeam, two use cases are described based on 5G protocol stacks, i.e., the initial access for 3GPP NR and neighbor discovery in mmWave vehicular networks.

Initial Access in 3GPP NR. NR is a set of specifications for 5G cellular networks first defined in the 3GPP Release 15 in 2018, and further refined in Release 16. Its physical layer is based on Orthogonal Frequency Division Multiplexing (OFDM), with a flexible frame structure in which the symbol duration and subcarrier spacing can be adapted to match traffic requirements. Henceforth, numerology 3 is considered, which features a symbol duration $T_{sym}$=8.92 µs, and slots of 14 symbols with duration $T_{slot}$=250 µs.

Beam management for the IA procedure in 3GPP NR involves four steps. In the first (beam sweep), the base station transmits directional Synchronization Signals (SSs) to cover all the TXBs of a certain codebook. Notably, each beam is swept with an SSB, which is a group of 4 OFDM symbols and 240 subcarriers in frequency. SSBs are interleaved to data transmissions in pre-defined time instants during bursts of 5 ms. There can be at most $N_{SS}$=64 SSBs for each burst, and if the sweep is not completed, the procedure resumes during the next burst. SS bursts are repeated with a periodicity $T_{SS}$ that can be configured by the NR protocol stack (5 to 160 ms, with default 20 ms). During the SSB beam sweep, the User Equipment (UE) itself, if configured for directional reception, performs a directional scan, measuring the quality of each beam pair (second step, beam measurement). Then, the UE selects the beam to be used to perform initial access (third step, beam decision). During the next SSB in the selected direction, the UE acquires information on the time and frequency resources in which the base station will be in receive mode for the random access message using the same TXB (fourth step, beam reporting). (See also M. Giordani, M. Polese, A. Roy, D. Castor, and M. Zorzi, "A Tutorial on Beam Management for 3GPP NR at mmWave Frequencies," *IEEE Commun. Surveys Tuts.*, vol. 21, pp. 173-196, First Quarter 2019 (incorporated by reference herein.)

Consider an exhaustive beam sweep (EBS), with $N_{tx}$ beams at the TX, and M at the RX. Thus, the number of beams to be scanned is then $N_{tx}M_{rx}$. Therefore, by adapting the analysis from Giordani et al. 2019 for an analog beamforming case, the time required to complete an EBS (i.e., steps 1 and 2) with the 3GPP NR frame structure is $$T_{EBS} = T_{SS}\left(\left\lceil \frac{N_{tx}M_{rx}}{N_{SS}} \right\rceil - 1\right) + \hat{T}_{EBS}. \quad (1)$$

The first term of the sum in Equation 1 represents the time to scan the first $(\lceil N_{tx}M_{rx}/N_{SS}\rceil -1)N_{SS}$ SSBs, in bursts of $N_{SS}$ SSBs. The remaining $\hat{N}_{SS}=N_{tx}M_{rx}-(\lceil N_{tx}(M_{rx}/N_{SS}\rceil -1) N_{SS}$ only occupies a portion $\hat{T}_{EBS}$ of the 5 ms of this last SSB burst, i.e., $$\hat{T}_{EBS} = \begin{cases} \frac{\hat{N}_{SS}}{2}T_{slot} - 2T_{sym} & \text{if } \hat{N}_{SS}\bmod 2 = 0 \\ \left\lfloor \frac{\hat{N}_{SS}}{2}\right\rfloor T_{slot} + 6T_{sym} & \text{otherwise.} \end{cases} \quad (2)$$

Thanks to the DeepBeam inference on the TXB and the AoA, as highlighted in FIG. 1B, the EBS can be skipped by passively eavesdropping ongoing data and control transmissions between the TX and other users. Notably, DeepBeam needs to acquire $\xi = K \cdot L$ I/Q samples to perform the classification task on the two inference engines. In 3GPP NR, each OFDM symbol is composed by S subcarriers, with $24 \cdot 12 \leq S \leq 275 \cdot 12$ subcarriers for numerology 3 (i.e., at most 400 MHz of bandwidth for each carrier frequency). Assuming one I/Q sample for each subcarrier (i.e., without considering oversampling factors), DeepBeam needs to eavesdrop $E = \lceil \xi/S \rceil$ OFDM symbols. Eventually, considering a TX that allocates J symbols to each user in its coverage area, with a round-robin scheduler, the time required for passive data collection on the $N_{tx}$ TXBs is $$T_{DB,d} = \max\{J, E\}N_{tx}T_{sym}. \quad (3)$$

In addition, the inference engines of DeepBeam require a certain processing time to perform the classification. (The processing time is considered negligible in the case of a traditional EBS, as a worst-case scenario for the comparison.) The end-to-end latency of the learning engine is $T_{DB,c,e2e}$, with the slowest layer providing results with a delay of $T_{DB,c,max}$. When implemented on FPGA, it is possible to exploit a pipeline effect; thus the network can classify $N_{tx}$ beams in $T_{DB,c,e2e}+(N_{tx}-1) T_{DB,c,max}$. Eventually, the overall delay (data collection and classification) of the DeepBeam engine for the 3GPP NR initial access is $$T_{DB} = \max\{\max\{J,E\}T_{sym}, T_{DB,c,max}\}(N_{tx}-1) + \max\{J, E\}T_{sym} + T_{DB,c,e2e} \quad (4)$$

Latency Analysis with FPGA CNN Synthesis. To understand whether DeepBeam can deliver an accuracy boost with respect to existing technologies, a specific instance of the inference engine for the TXB classification has been synthesized in FPGA. Specifically considered is a CNN with input size $\xi=512$ I/Q samples, a single convolutional layer with 16 filters, which yield an accuracy of 90% in a 12-beam classification problem. For synthesis, a Xilinx Zynq-7000 with part number xc7z045ffg900-2 was targeted. This platform was chosen since it is commonly used for software-defined radio implementations. High-level synthesis (HLS) was used for the CNN design. HLS allows the conversion of a C++-level description of the CNN directly into high level description (HDL) code such as Verilog. Therefore, improved results could be achieved with different design and synthesis strategies that further optimize real-time operations and minimize latency. By pipelining portions of the design, $T_{DB,c,e2e}=0.492$ ms, while $T_{DB,c,max}=0.34$ ms were able to be obtained. The resource utilization of the CNN design is below 5%—specifically, the design utilizes 32/1090 block RAMs, 28/900 DSP48E, 3719/437200 flip-flops and 2875/218600 look-up tables. Resource consumption can be further brought down by avoiding pipelining, to the detriment of latency.

Figure 5:
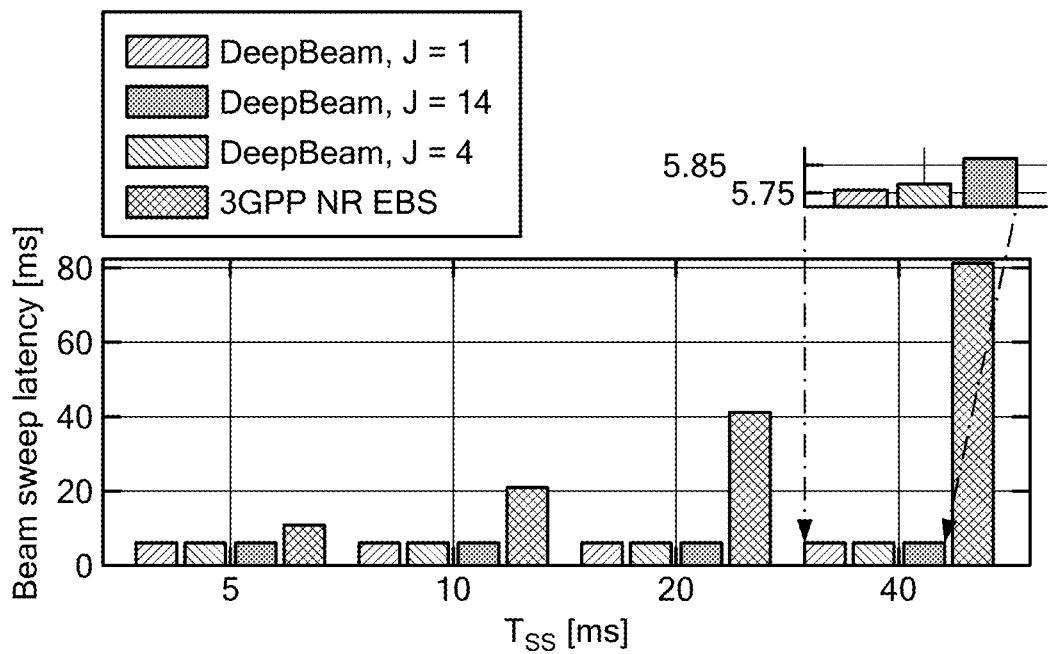
FIG. 5 illustrates beam sweep latency for different values of the SS burst periodicity $T_{SS}$ and of the number of contiguous symbols J allocated to each TXB by the base station scheduler for DeepBeam and prior art 3GPP NR EBS.

FIG. 5 reports $T_{EBS}$ and $T_{DB}$ for different values of $T_{SS}$. Numerology 3, a bandwidth of 400 MHz (i.e., S=3300), $N_{tx}=M_{rx}=12$, and different values of J were assumed, to represent various resource allocation policies of the NR base station. The results show how DeepBeam managed to decrease the beam sweep latency by a factor between 1.87 (for $T_{SS}=5$ ms) and 14.05 (for $T_{SS}=40$ ms). Notice that $T_{SS}=5$ ms represents a configuration where the overhead is rather high, as there is no interval between consecutive SSB bursts. In the default configuration with $T_{SS}=20$ ms, DeepBeam reduced the latency by up to 7.11 times.

Figure 6A:
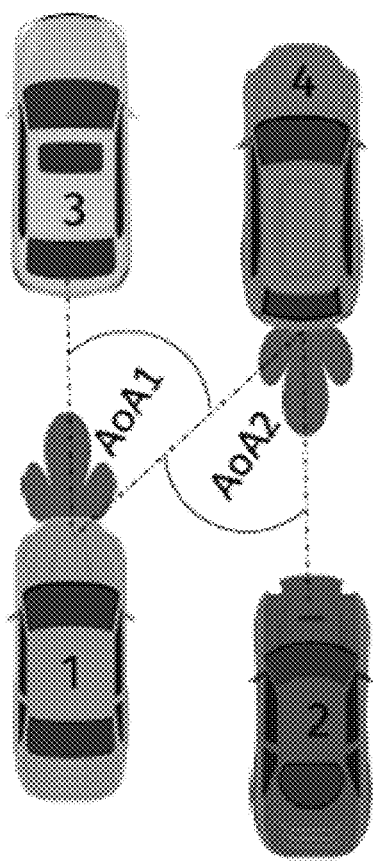
FIGS. 6A and 6B illustrate an embodiment of the transmission beam management system in a vehicular ad hoc scenario.
Figure 6B:
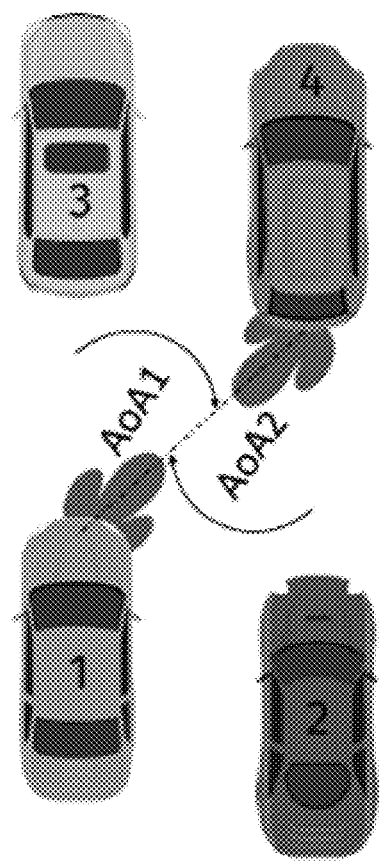

Neighbor Discovery in Vehicular Networks. Beam tracking and neighbor discovery are even more challenging in vehicular scenarios, since the dynamics of the system prevent an efficient use of pilot signals. This limits the time that nodes can spend performing a beam sweep. Moreover, since neighboring vehicles may change the reciprocal position frequently, each node needs fresh information on the best beam selection before starting a communication with another peer. Prior work on ad hoc mmWave communications relies on one or more of contextual information, custom hardware, and signaling to perform beam management. Conversely, FIGS. 6A and 6B illustrate how DeepBeam can be effective in a mmWave vehicular or other ad hoc scenario. In this example, four vehicles are proceeding on a two-lane street, transmitting and receiving data with the vehicle in the same lane. At the same time, the vehicles can use the DeepBeam inference engine to classify the AoA of the waveform received from the transmissions of the vehicles in the other lane. For example, if IEEE 802.11ad is used, DeepBeam can perform data collection during the interframe intervals which are mandated by the standard specifications, e.g., the DCF Interframe Space (DIFS) and the Short Interframe Space (SIFS), which would allow the collection of 22880 and 5280 I/Q samples, respectively, over 13 μs and 3 μs. Moreover, as the data collection and classification can be performed while (in this example) vehicles 1 and 3 are communicating with each other, when vehicle 1 needs to start transmitting to vehicle 4, it is already aware of the TXB to use (i.e., that corresponding to the AoA classified by DeepBeam). This makes it possible to skip any beam sweep or coordination to be performed before the link establishment between vehicle 1 and vehicle 4. Once again, if considering IEEE 802.11ad, this could take up to 225.4 μs for a codebook with 12 beams.

III. Examples

The data-driven approach has been extensively validated with a massive mmWave data collection campaign. An experimental mmWave prototype by NI was utilized to collect more than 4 TB of mmWave waveforms with (i) 4 phased array antennas at 60.48 GHz, (ii) 2 codebooks containing 24 one-dimensional beams and 12 two-dimensional beams; (iii) 3 receiver gains; (iv) 3 different AoAs; (v) multiple TX and RX locations. Furthermore, also leveraged were two custom-designed mmWave software-defined radios based on (i) an off-the-shelf Xilinx ZCU111 RF SoC-based evaluation board; (i) a transceiver board able to operate with 4 fully-digital RF chains between the unlicensed 57-64 GHz frequency band with 2 GHz bandwidth. A latency analysis of the approach was performed through a field-programmable gate array (FPGA) implementation of the CNN. Experimental results show that DeepBeam (i) achieved accuracy of up to 96%, 84% and 77% with a 5-beam, 12-beam and 24-beam codebook, respectively; (ii) reduced latency by up to 7×with respect to the 5G NR initial beam sweep in a default configuration and with a 12-beam codebook.

1. Experimental Setup and Dataset

This section describes the two mmWave testbeds used to collect the waveform data (Sections III-1.A and III-1.B). How the datasets are structured and how the models were trained are described in Section III-1.C.

A. Single-RF-Chain Testbed

The first testbed was based on the National Instruments, Corp. (NI) mmWave platform, with two software-defined transceivers (nodes) implemented on FPGAs, mounted on PXIe chassis, and running a custom 802.11ad-like physical layer. Besides the FPGAs, each transceiver chassis included an analog to digital converter (ADC) and a digital to analog converter (DAC), operating in baseband at 3.072 GS/s. The two nodes were equipped with 60 GHz radio frontends from SiBeam, Inc., which feature an up-conversion circuit, capable of bringing the signal to an RF carrier of 60.48 GHz, with an RF bandwidth of 1.76 GHz, and an analog phased array. The array (also shown in FIG. 7) had 12 antenna elements for the TX chain, and 12 for the RX chain. Each element could be controlled with 4 phase settings (i.e., a rotation of 0°, 90°, 180°, or 270°) to perform beam steering. By default, two codebooks were provided, with 24 beams in the azimuth plane, or 12 beams steered in the azimuth and elevation planes. The transmit power was 12 dBm, and it was possible to control the RX gain of the SiBeam boards. The physical layer in the two NI transceivers was based on IEEE 802.11ad, and generated (or received) samples at a rate that matched that of the ADC/DAC. I/Q samples were aggregated in blocks of 2048 samples, and 150 blocks defined a slot of 100 µs. 100 slots were then grouped in a frame (10 ms), which constituted the basic transmission unit.

Figure 7:
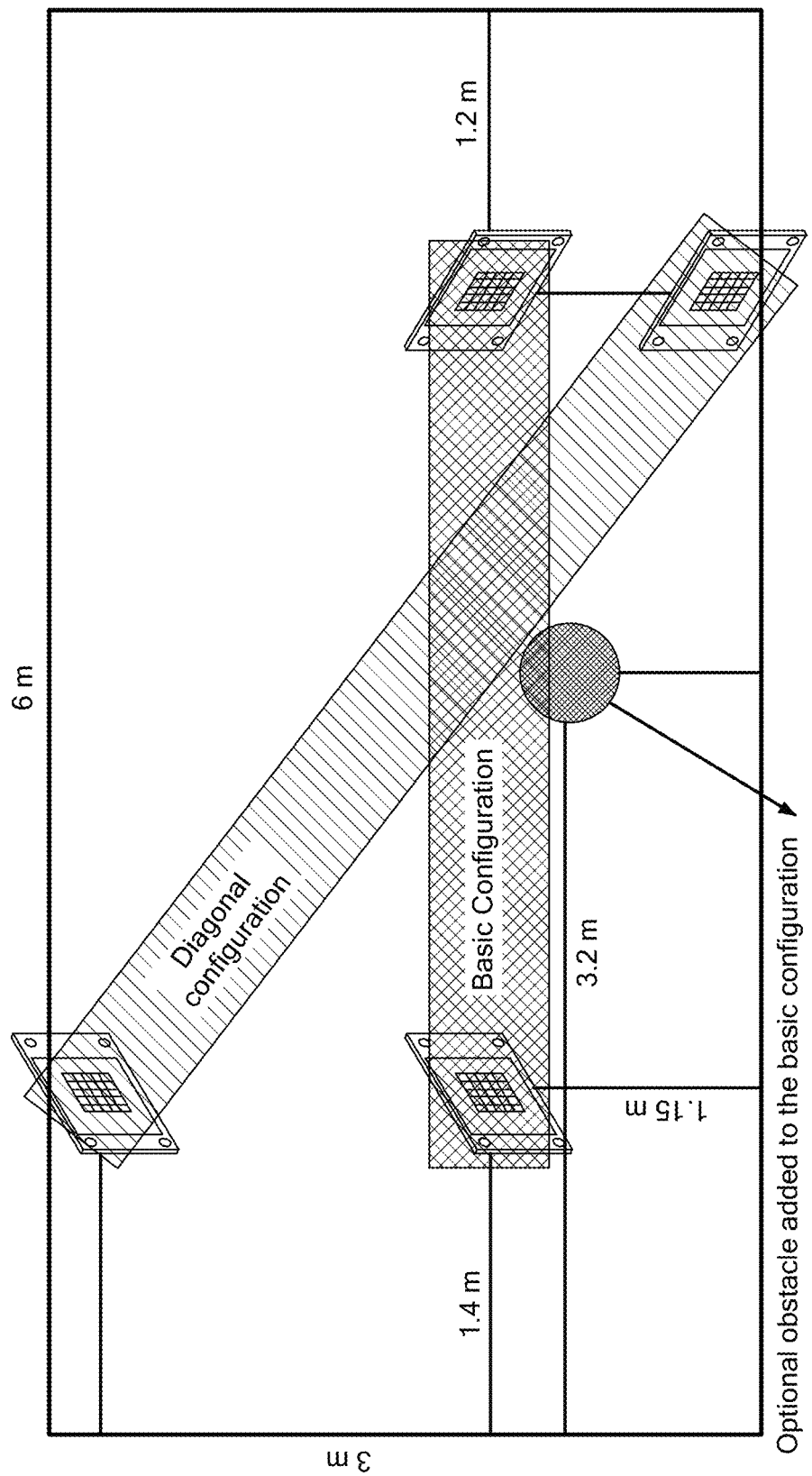
FIG. 7 illustrates a configuration of the room where the single-RF-chain dataset was collected, and position of the radios in the basic and diagonal configuration, and of the obstacle.

As far as the data collection process was concerned, the two mmWave nodes were positioned as in FIG. 7, in a 6×3 m room, with three different configuration. The first (i.e., basic configuration) featured two phased arrays facing each other, at a distance of 3.4 m, and at 1.15 m from the side wall. They had the same position in the second setup (i.e., obstacle configuration), but an obstacle (i.e., a chair) was added in the space between the two antennas, without obstructing the LOS. In the third setting (i.e., diagonal configuration), the phased array faced each other at a distance of 4.40 m, with the link crossing the room diagonally.

B. Multi-RF-Chain Testbed

Figure 8A:
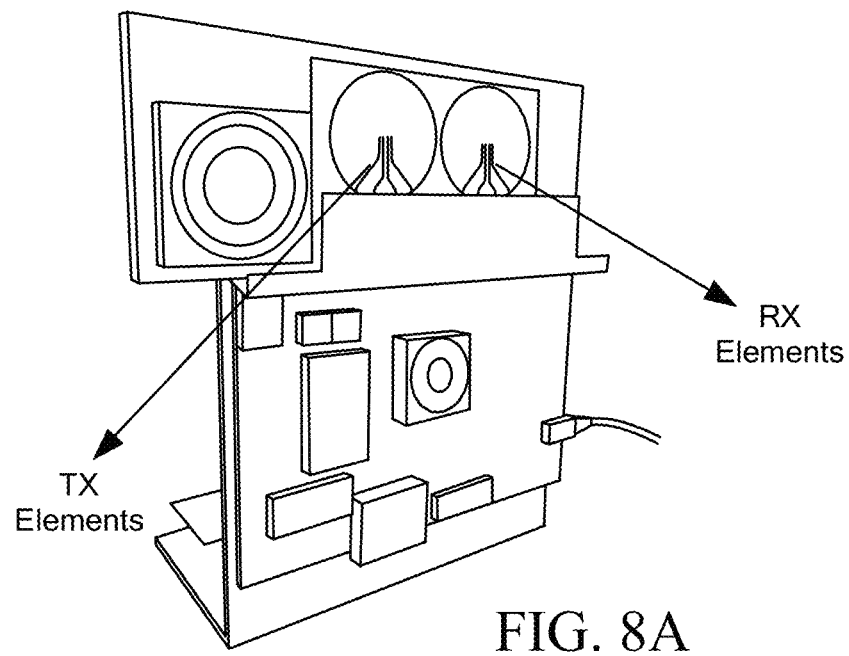
FIGS. 8A and 8B illustrate a multi-RF-chain testbed setup.
Figure 8B:
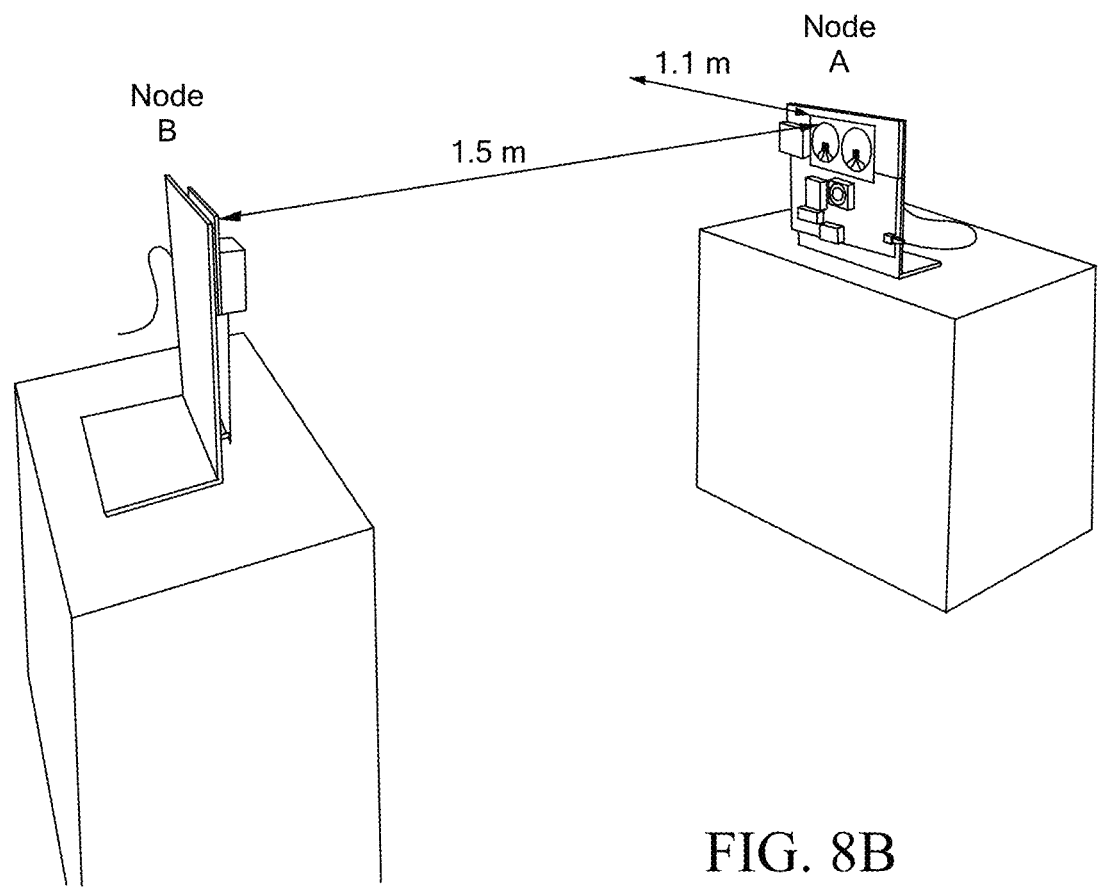
Figure 9A:
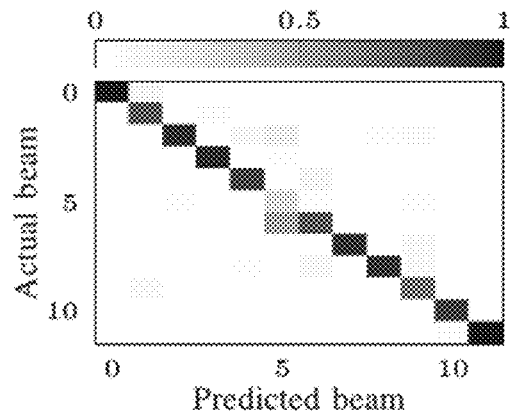
FIGS. 9A-9D illustrate confusion matrices for (in FIGS. 9A and 9B) a 12-beam codebook and (in FIGS. 9C and 9D) a 24-beam codebook, for TX antenna 0, RX antenna 1, basic configuration.
Figure 9B:
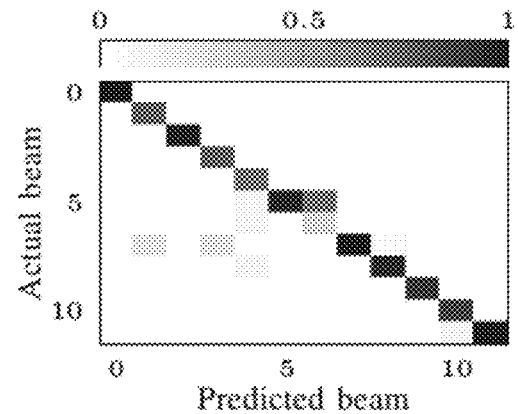
Figure 9C:
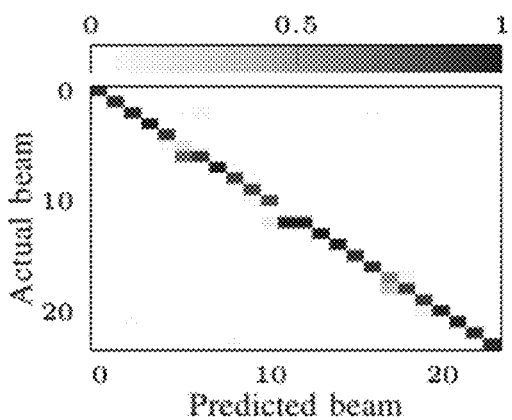
Figure 9D:
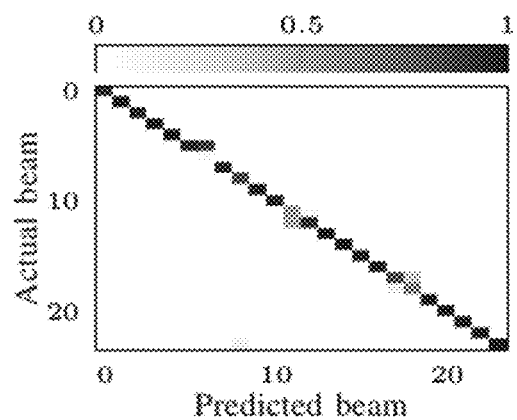

The second testbed featured two fully-digital mmWave transceiver boards, shown in FIGS. 8A and 8B, each based on an off-the-shelf Xilinx ZCU111 RFSoC-based evaluation board and a custom mezzanine board. This took care of the RF up-conversion, and had two arrays (for the TX and the RX) with 4 patch antenna elements each. With respect to the SiBeams radios, in this setup each antenna element was connected to an RF chain, with its own up-converters (with an output power of 12 dBm per channel), in the mezzanine board, and ADCs/DACs, on the Xilinx RFSoC. While the sampling rate of the ADCs/DACs was 3.93216 GS/s, with separate elements for the in-phase and quadrature components, the effective RF bandwidth was limited to 2 GHz by the up-converters and patch antennas. The boards were operated at a carrier frequency of 58 GHz. The two transceivers used a custom physical layer, based on OFDM, with a sampling rate that matched that of the ADCs/DAC, an oversampling factor of 4, and 256 subcarriers over a bandwidth of 1 GHz.

Differently from the single-RF-chain testbed, in which beamforming was performed in the analog domain by selecting one of the four phase shifts available in each antenna element, in the transceivers of this testbed the beamforming vector was applied digitally, i.e., the I/Q samples were multiplied by a vector of digital phase shifts (one for each of the 4 RF chains) before (after) the ADC (DAC) conversion. This enabled the definition of more precise beam patterns, and more degrees of freedom with respect to the selection of the steering vector. The data collection for this pair of nodes was performed with the two transceivers facing each other, at a distance of 1.5 m, as shown in FIG. 8B.

C. Datasets Structure and Training Procedure

More than 4 TB of raw I/Q samples were collected to evaluate the performance of DeepBeam, using the single- and the multi-RF-chain testbeds. Table I summarizes the different configurations in which the data collection was performed. Notably, for the single-RF-chain testbed, four different SiBeam 60 GHz frontends were used, the three configurations described in FIG. 7, and the two default TXB codebooks of the SiBeam phased arrays. For the AoA dataset, the receive phased array was physically rotated by $\theta E \{-45°, 0°, 45°\}$ with respect to the direction between the TX and RX. To collect data with low and high SNR (i.e., in a range between −15 dB and 20 dB, according to the combination of TXB and gain), three RX gain values were considered for each configuration of the single-RF-chain testbed, and three TX gain values for the multi-RF-chain testbed. For both, the receiver's beam (RXB) was always steered toward the boresight direction of the RX array. The raw I/Q data was collected in blocks of 2048 samples, for both the single-RF-chain and the multi-RF-chain testbed. For the first, 150000 blocks were collected for each combination of TXB and RX gain. For the second, 50000 blocks were collected for each combination of TXB and TX gain.

The models were trained using the Adam optimizer with a learning rate of $1=0.0001$. The training minimized the prediction error over the training set through back-propagation, with categorical cross-entropy as loss function. BeamNet, and the training/testing code in Keras, were implemented with TensorFlow machine learning library as a backend. An NVIDA DGX system equipped with 4 Tesla V100 GPUs was used. The models were trained for at least ten epochs, with batch size of 100. The dataset was split into 60% training set and 40% testing set.

TABLE 1

Setups for the I/Q data collection:

| Classification target | TX Codebook | Testbed | Configuration | (TX, RX) antenna combinations |
|---|---|---|---|---|
| TXB | 24-beams codebook | Single-RF-chain | Basic, with obstacle, diagonal | SiBeam (0, 1), (1, 0), (2, 1), (3, 1) |
| TXB | 12-beams codebook | Single-RF-chain | Basic, with obstacle, diagonal | SiBeam (0, 1), (1, 0), (2, 1), (3, 1) |
| AoA | 24-beams codebook | Single-RF-chain | Basic, with obstacle, diagonal | SiBeam (0, 1), (1, 0), (0, 2), (0, 3) |

TABLE 1-continued

Setups for the I/Q data collection:

| Classification target | TX Codebook | Testbed | Configuration | (TX, RX) antenna combinations |
|---|---|---|---|---|
| TXB | 5-beams codebook | Multi-RF-chain | Multi-RF-chain basic | Node A, Node B |

2. Experimental Results

The results obtained are first presented with the single-RF-chain testbed in Section III-2.A, and then those for the multi-RF-chain testbed in Section III-2.B.

A. Single-RF-Chain Results

FIGS. 9A-9D show the confusion matrices (CMs) obtained by training BeamNet on the 12-beam and 24-beam codebooks, for two different values of the L input parameter, and K=2048. It can be seen that the accuracy reaches above 80% and 77% in case of the 12-beam and 24-beam codebook, respectively. FIGS. 9A-9D indicate that BeamNet is very accurate in predicting the beams far from the center. However, it also hints that the model gets most confused when distinguishing among the central beams (11/12 and 5/6, respectively).

Figure 10:
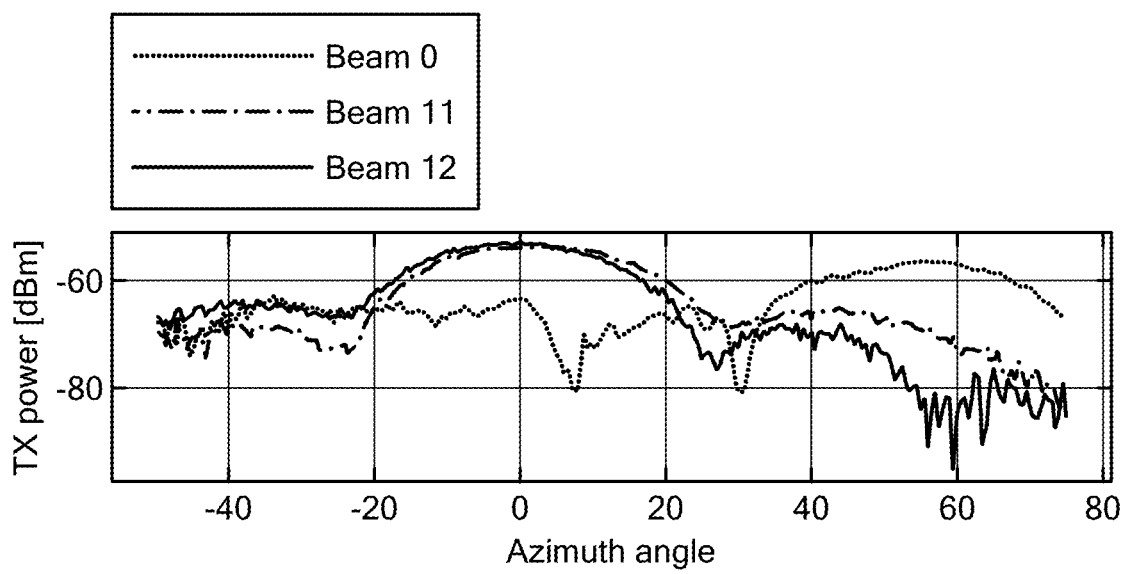
FIG. 10 illustrates beam patterns for beams 0, 11 and 12 of the 24-beam codebook.

Ultimately, this is because those beam patterns are extremely similar to each other. In order to verify that this is the case, FIG. 10 shows the beam patterns (i.e., the transmitted power as a function of the azimuth angle) for beams 11 and 12 of the 24-beam codebook. These patterns were obtained from the testbed vendor through measurements in an anechoic chamber. Beam 0 was also included for comparison. FIG. 10 shows that beams 11 and 12 had very similar shapes, which was reflected in the loss of accuracy in the trained model.

Figure 11:
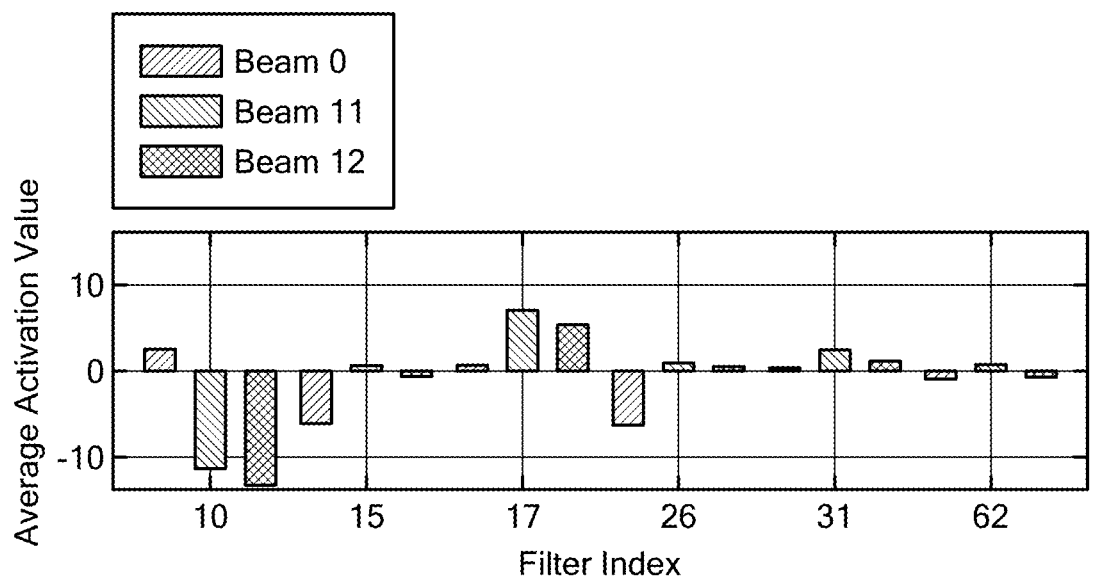
FIG. 11 illustrates average activation value of the first convolutional layer of BeamNet, for beams 0, 11 and 12 of the 24-beam codebook.

To further verify this issue, and also gain insights on the learning process of the CNN, how the filters in the first convolutional layer reacted to the different beams was also investigated. FIG. 11 shows the average activation values (over the test set) for the filters in the first layer of BeamNet that had at least one positive value (six filters in total). Notice that beams 11/12 had a strong positive reaction to filter 17, which was also very similar in magnitude. Moreover, the strongest reaction for beam 0 happened for filter 10, where beams 11/12 had a strong negative activation value. This confirms that BeamNet was learning to distinguish beams by discriminating different patterns in the received I/Q waveform.

Figure 12B:
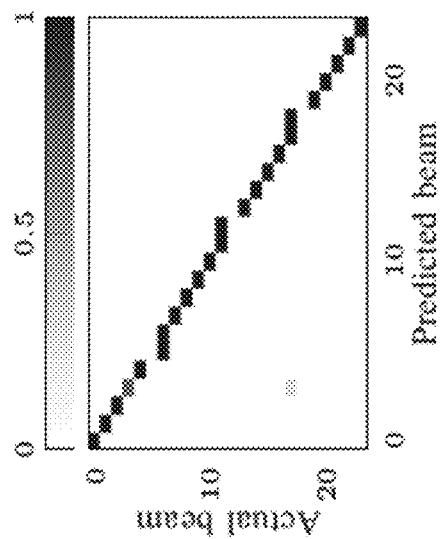
FIGS. 12A and 12B illustrate confusion matrices for (in FIG. 12A) low SNR and (in FIG. 12B) high SNR for the 24-beam codebook, L=1, TX antenna 0, RX antenna 1, basic configuration.
Figure 12A:
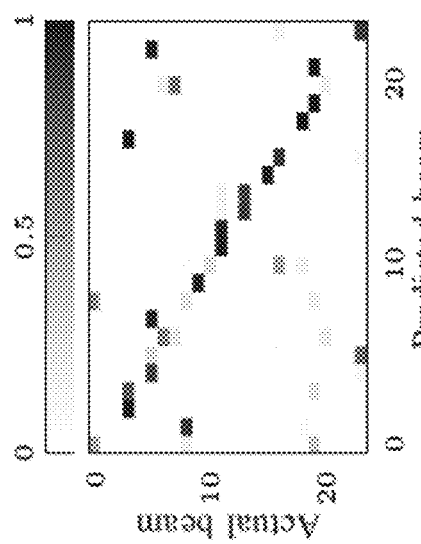
Figure 13A:
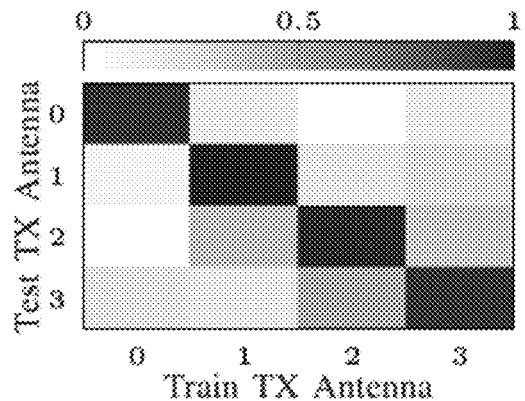
FIGS. 13A-13D illustrate confusion matrices of train one, test another (TOTA), for (in FIGS. 13A and 13B) the 12-beam codebook and (in FIGS. 13C and 13D) the 24-beam codebook.
Figure 13B:
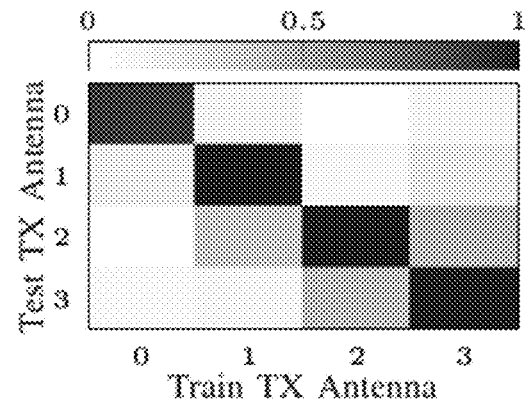
Figure 13C:
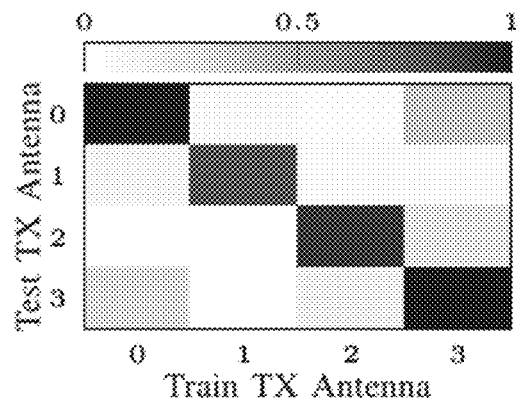
Figure 13D:
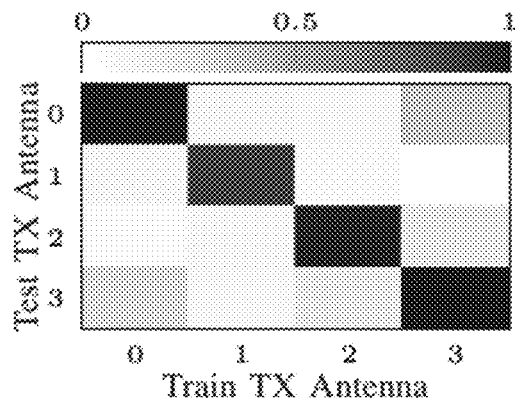

The CMs of FIGS. 9A-9D were obtained by mixing low, medium and high SNR waveforms. To get an insight on how the SNR impacted the accuracy of BeamNet, FIG. 12A shows the CMs when low (i.e., below 0 dB) and FIG. 12B shows the CMs when high (i.e., above 10 dB) SNR waveforms were used to train and test the model. Only the results for the 24-beam codebook are shown due to space limitations. As experienced in much of existing work, FIGS. 12A and B definitely indicate that there was a strong correlation between the accuracy of the model and the SNR level of the received waveforms. The accuracy dropped to 43% when low SNR samples were used, yet it went up to 86% when BeamNet was trained with high SNR samples only.

To understand whether the features learned by the CNN were related to the single antenna under consideration or generalized to multiple antennas, FIGS. 13(a)-(d) show the accuracy results obtained by training on one antenna and testing on another (TOTA), with both codebooks and all four phased arrays, with different values of L. Therefore, the main diagonal shows the results for train and test with the same antenna (TTSA). The first insight revealed by FIGS. 13A-13D is that the features learned by the CNN were a mixture of antenna-based and antenna-independent, since (i) the accuracy decreased when a CNN was tested on a dataset collected for a different antenna, but (ii) the accuracy did not plummet to random prediction.

Indeed, while the average TTSA accuracy was 83.08%, the average TOTA accuracy was 27.90%, which is more than 3× the random guess (1/12) in the 12-beam case when L=1. It can be further observed that while the average TTSA accuracy increased to 89.90% when L=5, the average TOTA accuracy slightly decreased to 25.29%. This can be explained by the fact that a larger model was more prone to overfitting. In this case, a smaller model led to less accuracy but more generalization. A similar effect was observed in the 24-beam codebook, where the TTSA increased from 78.51% to 85.91% between L=1 and L=5, but the TOTA slightly decreased from 16.97% to 15.35%.

Figure 14A:
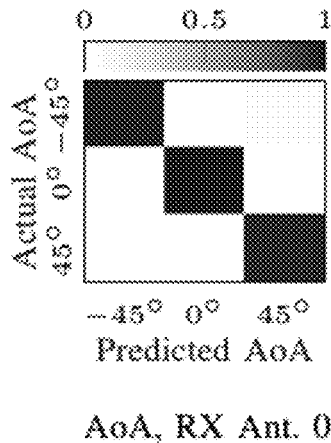
FIGS. 14A-14C illustrate confusion matrices of actual AoA results vs. predicted AoA for (in FIG. 14A) RX Ant. 0 and (in FIG. 14B) RX Ant. 1, and (in FIG. 14C) TOTA for Test RX Antenna vs. Train RX Antenna.
Figure 14B:
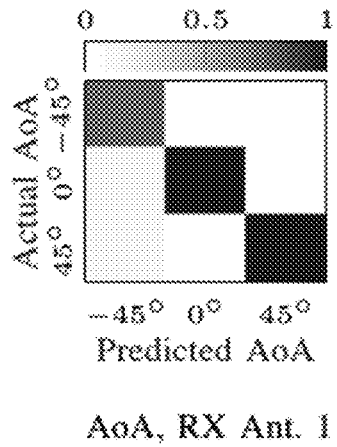
Figure 14C:
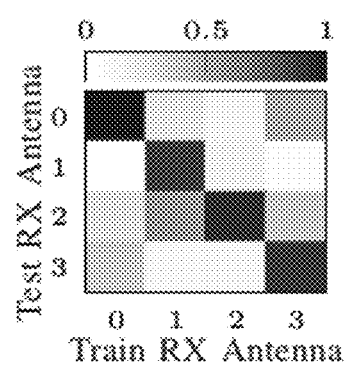

FIGS. 14A-14C show the results obtained after training the CNN to detect the AoA of an incoming beam, for two different antennas. The TOTA results are also reported in FIG. 14C. FIGS. 14A-14C indicate that the CNN obtained a very high accuracy of more than 90%. As before, the TOTA results (57.57% in this case) show that the learned features were a mix of antenna-dependent and independent features.

Figure 15A:
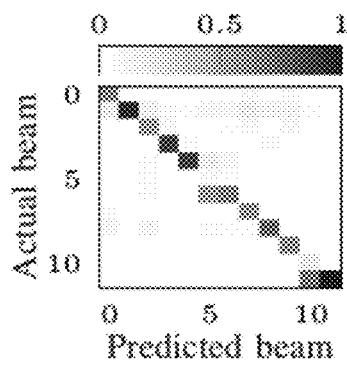
FIGS. 15A-15C illustrate confusion matrices for (in FIG. 15A) actual beam vs. predicted beam for the 12-beam codebook.
Figure 15B:
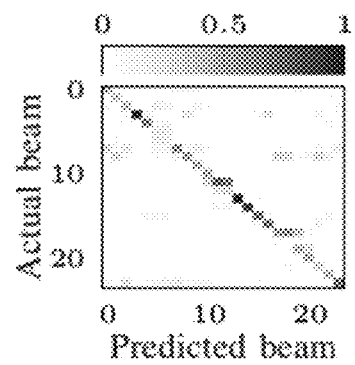
Figure 15C:
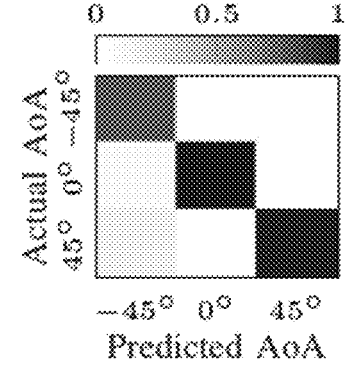
Figure 16A:
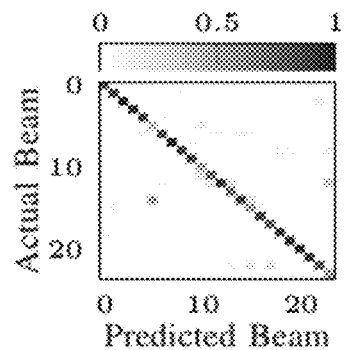
FIGS. 16A-16F illustrates confusion matrices for diagonal and obstacle results for (in FIG. 16A) actual beam vs. predicted beam for the 24-beam codebook, TX antenna 0.
Figure 16B:
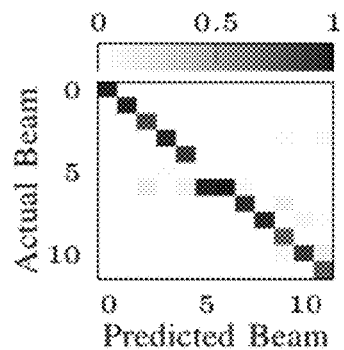
Figure 16C:
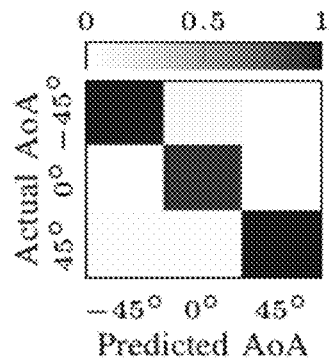
Figure 16D:
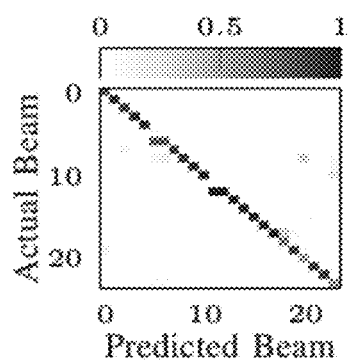
Figure 16E:
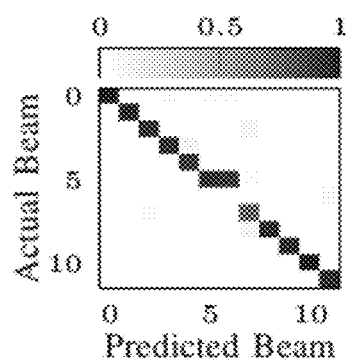
Figure 16F:
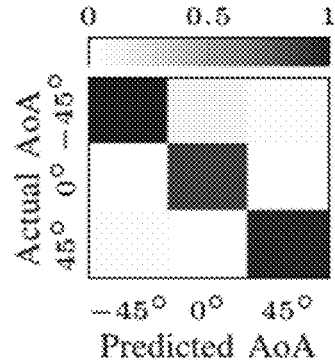

To further test the generalization capability of the CNN, it was trained and tested on a mixed dataset with waveforms coming from all 4 antennas. FIGS. 15A-15C show the obtained accuracy in all three learning problems when L=1, and indicates that the CNN was very effective in generalizing to different antennas, increasing the accuracy of 124%, 191% and 44% in case of 24-beam, 12-beam and AoA with respect to the average TOTA accuracy experienced when trained with a single dataset.

Finally, the results obtained in the Diagonal and Obstacle configurations are shown in FIGS. 16A16C and FIGS. 16D-F respectively. Interestingly, it can be seen that the CNN is flexible and robust to different conditions. In the case of 24-beam, a significant increase in accuracy can be seen with respect to the basic configuration, while the other accuracy results are in line with that experienced in the basic configuration.

B. Multi-RF-Chain Results

Figure 17A:
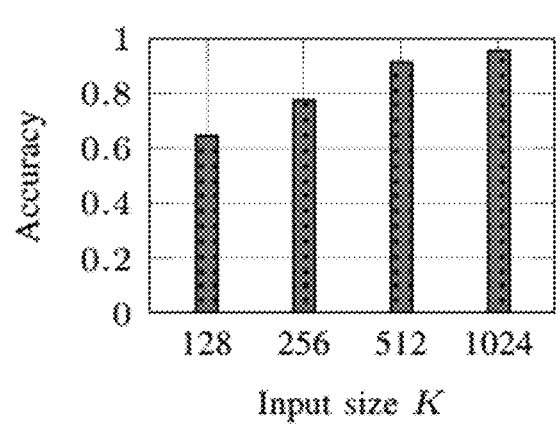
FIGS. 17A and 17B illustrate multi-RF-chain results for (in FIG. 17A) a graph of accuracy vs. input size K; and (in FIG. 17B) a confusion matrix of actual beam vs. predicted beam.
Figure 17B:
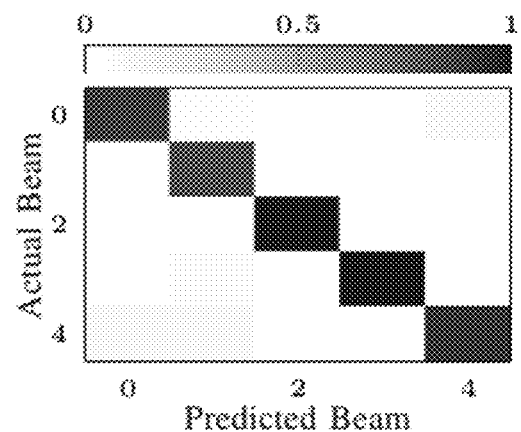

FIGS. 17A-17B report the results for the multi-RF-chain dataset. In particular, FIG. 17A shows the accuracy as a function of the input size K. For this, a smaller network than the baseline was trained, with only one convolutional layer (with 12 filters of size 7) and no dense layer other than the softmax. FIG. 17B shows the confusion matrix (CM) in the case of K=512, where accuracy of 91.56% was achieved. It can be pointed out that such high accuracy with a smaller model can be achieved because in the multi-RF-chain testbed beamforming vectors were applied digitally, thus resulting in more precise beam patterns with respect to the single-RF-chain testbed.

C. Conclusions

The technology described herein, termed DeepBeam, provides a framework for beam management in mmWave networks that can eliminate the need of beam sweeping by inferring through deep learning the direction and the AoA of the transmitter beam. An extensive experimental data collection campaign has been conducted with two software-defined radio testbeds, and by using multiple antennas, codebooks, gains and locations. The learning models have been implemented on FPGA to evaluate the latency performance. Results show that DeepBeam (i) achieved accuracy of up to 96%, 84% and 77% with a 5-beam, 12-beam and 24-beam codebook, respectively; (ii) reduced latency by up to 7× with respect to the 5G NR initial beam sweep in a default configuration and with a 12-beam codebook.

As used herein, "consisting essentially of" allows the inclusion of materials or steps that do not materially affect the basic and novel characteristics of the claim. Any recitation herein of the term "comprising," particularly in a description of components of a composition or in a description of elements of a device, can be exchanged with "consisting essentially of" or "consisting of."

To the extent that the appended claims have been drafted without multiple dependencies, this has been done only to accommodate formal requirements in jurisdictions that do not allow such multiple dependencies.

The present technology has been described in conjunction with certain preferred embodiments and aspects. It is to be understood that the technology is not limited to the exact details of construction, operation, exact materials or embodiments or aspects shown and described, and that various modifications, substitution of equivalents, alterations to the compositions, and other changes to the embodiments and aspects disclosed herein will be apparent to one of skill in the art.

What is claimed is:

1. A system for beam management in a wireless network, comprising:
    a radio frequency (RF) receiver comprising an antenna array configured to passively receive incoming RF transmissions without coordination between the RF receiver and a source transmitter of the RF transmissions, wherein the incoming RF transmissions do not include a pilot sequence or a synchronization sequence; and
    a processing system comprising:
        receiver circuitry in communication with the radio frequency receiver to produce in-phase/quadrature (I/Q) input samples from the incoming RF transmissions, and
        a learning module comprising a trained classification module operative to receive the I/Q input samples from the receiver circuitry and process the I/Q input samples to determine transmitted beam information of incoming RF transmissions, the learning module further comprising:
            a beam inference engine to determine waveform characteristics of the incoming RF transmissions, and
            an angle of arrival engine operative to determine angles of arrival of the incoming RF transmissions on the antenna array,
            wherein the processing system is further operative to select an incoming RF transmission and angle of arrival based on the determined waveform characteristics for beam management operations; and
    an RF transmitter located at a same node with the RF receiver and in communication with the processing system and operative to transmit RF signals at an angle corresponding to the selected angle of arrival without coordination between the system for beam management and the source transmitter of the RF transmissions.

2. The system of claim 1, wherein the processing system includes a codebook that comprises a set of codewords corresponding to an identification of the incoming RF transmissions and is operative to select one of the incoming RF transmissions from an identified codeword.

3. The system of claim 1, wherein the processing system is further operative to associate a quality metric to each of the incoming RF transmissions, the quality metric comprising a received power value, a reference signal received power value, a received signal strength indicator, a reference signal received quality value, a signal-to-noise ratio, or a signal-to-noise-and-interference ratio.

4. The system of claim 3, wherein the processing system is further operative to rank the incoming RF transmissions by the quality metric associated with each of the incoming RF transmissions.

5. The system of claim 1, wherein the processing system is operative to match a selected incoming RF transmission at a selected angle of arrival to a synchronization signal block transmitting from a direction corresponding to the selected angle of arrival and corresponding time and frequency resources.

6. The system of claim 1, wherein the processing system includes a protocol stack including a physical layer and a medium access control layer, and the learning module is in communication with one or both of the physical layer and the medium access control layer to:
    receive an activation command to trigger the learning module to process the I/Q samples,
    transmit the determined transmitted beam information to the protocol stack, or
    both receive an activation command to trigger the learning module to process the I/Q samples and transmit the determined transmitted beam information to the protocol stack.

7. The system of claim 1, wherein the trained classification module is trained to recognize transitions between occurrences of the I/Q input samples in an I/Q complex plane.

8. The system of claim 1, wherein the trained classification module comprises a deep learning neural network comprising a convolutional neural network, a multi-layer perceptron, a feedforward network, a recurrent neural network, a long-short term memory neural network, or a support vector machine.

9. The system of claim 1, wherein the learning module comprises learning circuitry including one or more logic devices.

10. The system of claim 1, wherein the processing system is operative to carry out the beam management operations including providing initial access to a remote transmitter located at a different node than the RF receiver, tracking of transmissions from one or more remote transmitters, and discovery of neighboring transmitters and receivers.

11. The system of claim 1, wherein the processing system is operative to receive the incoming transmissions having a frequency of at least 450 MHz.

12. A method for beam management in a wireless network, comprising:
    passively detecting, at beam management system having a radio frequency (RF) receiver including an antenna array, incoming RF transmissions without coordination between the RF receiver and a source transmitter of the RF transmissions, wherein the incoming RF transmissions do not include a pilot sequence or a synchronization sequence;
    producing, by receiver circuitry of a processing system in communication with the RF receiver, in-phase/quadrature (I/Q) input samples from the incoming RF transmissions;

inputting to a learning module of the processing system, in-phase/quadrature (I/Q) input samples from the incoming RF transmissions;
   determining, by a trained classification module of the learning module, transmitted beam information of the incoming RF transmissions including:
      determining waveform characteristics of the incoming RF transmissions by processing the I/Q input samples in a beam inference engine of the learning module;
determining angles of arrival of the incoming RF transmissions on the antenna array by processing the I/Q input samples in an angle of arrival engine of the learning module;
   selecting an incoming transmission beam based on the angle of arrival and the waveforms for beam management operations; and
   transmitting, by an RF transmitter located at a same node with the radio frequency receiver, RF signals at an angle corresponding to the selected angle of arrival without coordination between the beam management system and the source transmitter of the RF transmissions.

13. The method of claim 12, further comprising performing one or more of the beam management operations, including providing initial access to a transmitter, tracking of transmissions from one or more transmitters, and discovery of neighboring transmitters and receivers.

14. The method of claim 12, further comprising, from an RF transmitter located at a same node with the RF receiver, transmitting RF signals at an angle corresponding to the selected angle of arrival.

15. The method of claim 12, further comprising selecting one of the incoming RF transmissions from an identified codeword in a codebook that comprises a set of codewords corresponding to an identification of the incoming RF transmissions.

16. The method of claim 12, further comprising associating a quality metric to each of the incoming RF transmissions, the quality metric comprising a received power value, a reference signal received power value, a received signal strength indicator, a reference signal received quality value, a signal-to-noise ratio, or a signal-to-noise-and interference ratio.

17. The method of claim 16, further comprising ranking the incoming RF transmissions by the quality metric associated with each of the incoming RF transmissions.

18. The method of claim 12, further comprising at least one of:
   providing initial access to a remote transmitter located at a different node than the radio frequency receiver;
   tracking transmissions from one or more remote transmitters; and
   discovering neighboring transmitters and receivers.

* * * * *